(12) United States Patent
Plett

(10) Patent No.: US 10,807,331 B2
(45) Date of Patent: Oct. 20, 2020

(54) APPARATUS FOR LOADING AND UNLOADING A ROUND BODY RELATIVE TO A SHELF SPACED ABOVE A GROUND SURFACE

(71) Applicant: Vidir Machine Inc., Arborg (CA)

(72) Inventor: Delmer Plett, Arborg (CA)

(73) Assignee: Vidir Solutions Inc., Arborg (CA)

( * ) Notice: Subject to any disclaimer, the term of this patent is extended or adjusted under 35 U.S.C. 154(b) by 340 days.

(21) Appl. No.: 15/850,833

(22) Filed: Dec. 21, 2017

(65) Prior Publication Data

US 2019/0193352 A1    Jun. 27, 2019

(51) Int. Cl.
*B29D 30/00* (2006.01)
*B65G 1/04* (2006.01)

(52) U.S. Cl.
CPC ....... *B29D 30/0016* (2013.01); *B65G 1/0407* (2013.01); *B65G 2201/0273* (2013.01)

(58) Field of Classification Search
CPC .............. B29D 30/0016; B65G 1/0407; B65G 2201/0273
See application file for complete search history.

(56) References Cited

U.S. PATENT DOCUMENTS

| 4,389,148 A * | 6/1983 | Lorenz | B65G 57/035 414/794.3 |
| 4,439,091 A * | 3/1984 | Frias | E21B 19/15 175/85 |
| 6,179,541 B1 * | 1/2001 | Rioux | B65G 1/0407 187/222 |
| 8,721,251 B1 * | 5/2014 | Razumov | B65G 1/0407 108/144.11 |
| 9,199,511 B2 * | 12/2015 | Hodges | B60B 30/00 |

* cited by examiner

*Primary Examiner* — Michael S Lowe
(74) *Attorney, Agent, or Firm* — Christopher J. Dynowski; Ade & Company Inc.; Adrian D. Battison

(57) ABSTRACT

An apparatus suitable for both loading and unloading a round body, for example a tire, relative to a stationary shelf comprises, for loading, a body locating member defining a contact surface which confines in fixed location the round body between same and a shelf edge of the stationary shelf and a body lifting arrangement on which the body locating member is movable carried so as to displace the locating member upwardly relative to the shelf edge. For unloading the apparatus comprises an unloading arm defining a body contact surface that is displaceable in movement arranged perpendicular to a rotational axis of the body from a location outside a shelf storage space defined vertically above the shelf where the body is received when on the shelf, to the shelf storage space so as to displace the body off the shelf.

17 Claims, 17 Drawing Sheets

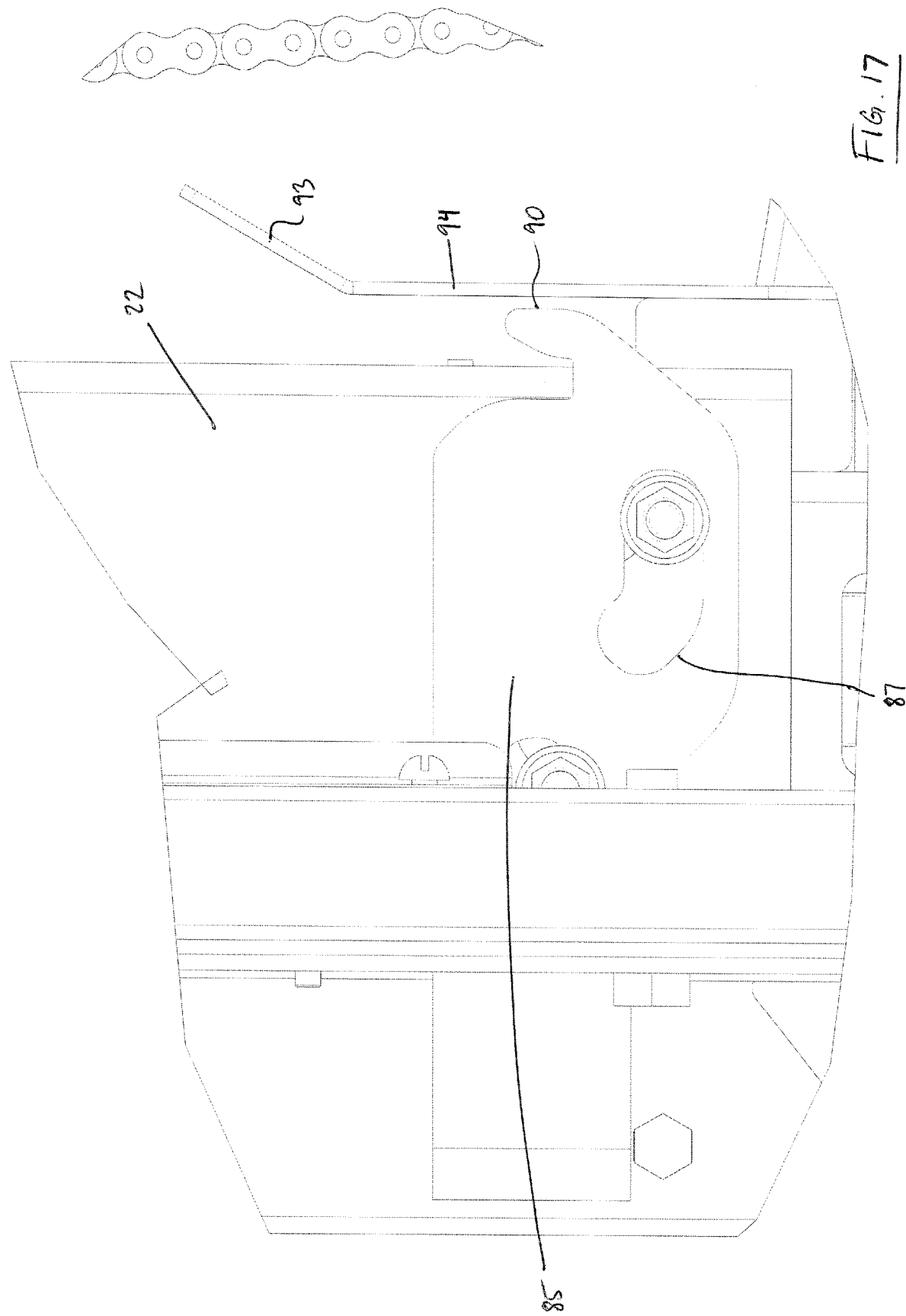

APPARATUS FOR LOADING AND UNLOADING A ROUND BODY RELATIVE TO A SHELF SPACED ABOVE A GROUND SURFACE

FIELD OF THE INVENTION

The present invention relates generally to apparatus for loading or storing round bodies, such as tires and that for unloading or retrieving same, relative to a shelf that is spaced above a ground surface. More particularly, the present invention relates to such an apparatus comprising a body locating member spaced from the shelf edge over which the round body is displaced onto and off of the shelf and a lifting arrangement on which the body locating member is mounted so as to cooperate to lift and roll the round body over the shelf edge for loading onto the shelf, and relates to an apparatus comprising an unloading arm defining a contact surface for engaging the round body to displace the tire back over the shelf edge for unloading from the shelf.

BACKGROUND

Round bodies, such as tires or wheels each including a rim and a tire mounted thereon, are typically stored on shelves which are vertically spaced above a ground or floor surface. Some such shelves are permanently stationary units which are fixedly mounted on a framework so as to form a storage rack, while other shelves are movably mounted on a track oriented in an upright plane such that the shelves can be circulated along and/or around the track to present each shelf at a loading position at or adjacent the bottom of the track thus forming a vertical storage carousel.

One known means of loading the tires respectively in an upstanding condition onto a shelf, particularly in the field of vertical storage carousels, is a foldable ramp which is locatable adjacent a shelf edge over which the tire is displaced in movement onto and off the shelf. The foldable ramp provides an inclined upper surface arranged to extend downwardly and outwardly from the shelf edge to the floor surface such that the tire can be rolled manually by hand from the floor surface across the upper surface defined by the deployed foldable ramp and onto the shelf. Thus this still requires considerable manual input from a human user to displace the tire from the floor surface to the shelf, which presents a safety hazard when these items such as tires or wheels can be quite heavy. The ramp is also suited for unloading a tire from the shelf but again manual input from the human user is required to displace the tire from the shelf to the ramp and to control movement of the tire across the upper surface of the ramp towards the ground surface.

SUMMARY OF THE INVENTION

According to an aspect of the invention there is provided an apparatus for loading a round body, which is rounded around a rotational axis of the round body, onto a stationary shelf in upstanding condition of the round body in which the rotational axis is oriented substantially horizontally so that the round body is enabled to roll across a ground surface, the shelf having a shelf edge spaced above the ground surface and extending in a longitudinal direction of the shelf, the apparatus comprising:

a frame adapted for resting on the ground surface;

a body locating member defining a body support surface on an inner side of the body locating member spaced from the shelf edge in a transverse direction crosswise to the longitudinal direction for engaging an outer surface of the round body and locating the round body in contact with the shelf edge so that the round body is confined in fixed location between the body locating member and the shelf edge;

a pair of lateral support members each defining an upright inner surface in opposite spaced relation to the inner surface of the other one of the lateral support members for receiving the round body in the upstanding condition between the pair of lateral support members when the round body is confined in fixed location between the body support surface of the body locating member and the shelf edge;

the body locating member being movably carried on a body lifting arrangement supported on the frame, the body lifting arrangement being operable to displace the body locating member in upward and downward movement between a lowered condition of the body locating member in which the body support surface is located below the shelf edge so as to be suited for passing the round body across the body locating member into an initial loading position in which the round body in the upstanding condition is received between the body support surface and the shelf edge and between the lateral support members, and a raised condition of the body locating member in which the body support surface is located above the shelf edge, so as to cooperate with the shelf edge which is stationary to lift the round body from the ground surface and roll the round body over the shelf edge onto the shelf to dispose the round body in a storage position on the shelf.

Thus there is provided an arrangement in which there is no manual input from the human user to lift the round body, such as a tire or wheel, over the shelf edge to place the body in the storage position on the shelf.

Preferably the apparatus further includes a transition support member movably carried on the body lifting arrangement, the transition support member defining a secondary body support surface disposed at a location which is spaced from the body support surface of the body locating member in a forward loading direction towards the shelf edge so as to be located intermediate the body support surface and the shelf edge, and which is arranged to be spaced below the body support surface in the raised condition of the body locating member for engaging the outer surface of the round body at a prescribed height of the body locating member above the shelf edge to transfer the round body from the initial loading position into a transfer position as the body lifting arrangement continues to displace the body locating member upwardly, the round body disposed in the transfer position being received between the shelf edge and the second body support surface of the transition support member, so as to urge the round body to be displaced in the forward loading direction across the shelf edge and onto the shelf.

In the illustrated arrangement the secondary body support surface is rounded around an axis of the transition support member which is oriented substantially horizontal and substantially parallel to the longitudinal direction of the shelf.

In the illustrated arrangement the transition support member is carried on the body lifting arrangement in fixed relation with respect to the axis of the transition support member. Thus in this arrangement the transition support member is not a roller mounted for rotation around its own axis.

In one arrangement the transition support member is cantilevered in the forward loading direction from a common support framework which is coupled to the body lifting arrangement and to which the body locating member is coupled.

In such an arrangement the transition support member may be connected to an interconnection link spanning from the transition support member to the common support framework, the interconnection link being pivotally connected to the common support framework to define a pivot axis oriented substantially horizontal and substantially parallel to the longitudinal direction of the shelf so that in the lowered condition of the body locating member when the body locating member is located at the ground surface the transition support member is located at a minimum height from the body support surface of the body locating member and in the raised condition of the body locating member the transition support member is deployed to a prescribed height below the body support surface of the body locating member, by downward movement about the pivot axis of a distal end of the interconnection link where the transition support member is connected, so as to be suited for engaging the outer surface of the round body at the prescribed height of the body locating member above the shelf edge to transfer the round body from the initial loading position to the transfer position.

Preferably the body locating member comprises a roller mounted on the body lifting arrangement for rotational movement about a roller axis oriented substantially horizontal and substantially parallel to the longitudinal direction of the shelf, a circumferential outer surface of the roller defining the body support surface of the body locating member.

In such an arrangement, preferably there is provided a fixed member carried by the body lifting arrangement defining a free longitudinal edge extending substantially parallel to the roller axis, the free edge of the fixed member being located above the circumferential outer surface of the roller and being spaced away from an innermost end of the roller that is proximal the shelf edge, so as to provide a fixed traction surface positioned to engage the outer surface of the round body when the round body is displaced in a rearward unloading direction out of the initial loading position to remove the round body from the apparatus.

Preferably the free edge is spaced outwardly away from the roller axis, so as to be spaced from the roller axis in the rearward unloading direction, such that the free edge of the fixed member is located above the circumferential outer surface but between the roller axis and an outermost end of the roller that is distal to the shelf edge.

Preferably the fixed member defines an upper surface extending from the free edge that is inclined downwardly and outwardly away from the innermost end of the roller so as to avoid engaging the outer surface of the round body in the initial loading position.

In one arrangement the apparatus further includes a body unloading mechanism configured to engage a portion of the outer surface of the round body distal to the shelf edge when the round body is disposed on the shelf in the storage position so as to displace the round body in a rearward unloading direction, which is opposite to the forward loading direction, over the shelf edge to the apparatus.

Thus is provided an arrangement in which there is no manual input from the human user to displace the round body back over the shelf edge to the apparatus so as to return the body to the ground surface.

In such an arrangement the body unloading mechanism may be operable by upward movement of the body locating member from the lowered condition to the raised condition that is effected by the body lifting arrangement.

In one arrangement the body unloading mechanism comprises:
an unloading arm defining a body contact surface for engaging the outer surface of the round body in the storage position;
the unloading arm being mounted on the frame so that the body contact surface is movable relative to the shelf in a direction arranged perpendicularly to the rotational axis of the round body between an idle position in which the body contact surface is located outside a shelf storage space defined vertically above the shelf in which the round body is located in the storage position and an operating position in which the contact surface is disposed within the shelf storage space;
a flexible linkage having a first end coupled to the unloading arm located at a position which is spaced from the body lifting arrangement in the forward loading direction and traversing a path from the first end at the unloading arm to a second end of the flexible linkage located at an access position adjacent the body lifting arrangement and spaced from the shelf edge in the transverse direction, the first end of the flexible linkage being movable in fixed relation to the unloading arm so that movement of the first end of the flexible linkage effects movement of the unloading arm from the idle position to the operating position;
wherein there is provided a catch movably carried on the body lifting arrangement so as to be movable in fixed relation to the body locating member, the catch being adapted for coupling with the second end of the flexible linkage so as to grab and pull the flexible linkage to displace the unloading arm from the idle position to the operating position in the upward movement of the body locating member;
the second end of the flexible linkage disposed in the access position being presented at a location which lies along a path of upward and downward movement of the catch so as to be suitably located for grabbing by the catch;
the catch being movable relative to the body lifting arrangement between an inactive position in which the catch is spaced relative to a horizontal direction from the second end of the flexible linkage disposed in the access position so as to pass clear of the second end of the flexible linkage in the path of upward and downward movement of the catch to an active position in which the catch coincides in horizontal location with the second end of the flexible linkage so as to grab the second end of the flexible linkage as the catch passes by the second end in the upward movement of the body locating member such that the body unloading mechanism is selectively activatable for operation to displace the round body off the shelf so as to move the round body out of the storage position.

In such an arrangement, preferably there is provided a guide surface supported on the frame at a location below the access position of the second end of the flexible linkage in which the second end of the flexible linkage is located at a height above the catch in the lowered condition of the body locating member when the body locating member is located at the ground surface, the guide surface being inclined downwardly and in a horizontal direction from the second end of the flexible linkage towards the catch, so as to engage an outer surface of the catch in downward movement of the body locating member such that the catch is displaced by contact with the guide surface from the active position to the inactive position.

According to another aspect of the invention there is provided an apparatus for unloading a round body, which is rounded around a rotational axis of the round body, from a stationary shelf on which the round body is located in a storage position and in upstanding condition of the round body in which the rotational axis is oriented substantially horizontally so that the round body is enabled to roll across a ground surface;

the shelf having a shelf edge spaced above the ground surface and extending in a longitudinal direction of the shelf, across which the round body is passed for unloading;

a shelf storage space being defined vertically above the shelf in which the round body is located in the storage position;

the shelf defining a bottom opening which is spaced in a transverse direction crosswise to the longitudinal direction from the shelf edge so that an exterior space beneath the shelf is communicable with the shelf storage space above the shelf via the bottom opening;

the apparatus comprising:

a frame adapted for resting on the ground surface;

an unloading arm defining a body contact surface for engaging an outer surface of the round body in the storage position;

the unloading arm being mounted on the frame so that the body contact surface is movable relative to the shelf in a direction arranged perpendicularly to the rotational axis of the round body between an idle position in which the body contact surface is located outside the shelf storage space and an operating position in which the contact surface is disposed within the shelf storage space at a location arranged to coincide with a portion of the outer surface of the round body distal to the shelf edge to engage the outer surface of the round body so as to displace the round body in an unloading direction over the shelf edge;

wherein the body contact surface of the unloading arm disposed in the idle position is located in the exterior space beneath the shelf so that in movement of the unloading arm from the idle position to the operating position the body contact surface is passed through the bottom opening of the shelf to engage the portion of the outer surface of the round body distal to the shelf edge.

Preferably the unloading arm is pivotally mounted on the frame at a pivot axis located below the shelf so that in movement from the idle position to the operating position the body contact surface follows an arcuate path extending upwardly and transversely to the longitudinal direction in the unloading direction so as to lift and roll the round body over the shelf edge.

When the bottom opening is located centrally with respect to the transverse direction between the shelf edge and an opposite longitudinally extending terminus of the shelf so as to be suited for locating the round body transversely centrally in the shelf storage space, the bottom opening being spaced in the transverse direction from each of the shelf edge and the opposite longitudinally extending terminus of the shelf, preferably the body contact surface is located intermediate a transverse center of the bottom opening and the opposite longitudinally extending terminus of the shelf when the body contact surface transitions from the exterior space to the shelf storage space through the bottom opening in the arcuate path of the body contact surface.

In one arrangement the pivot axis of the unloading arm is located at a position spaced vertically below the shelf and intermediate the shelf edge over which the round body is rolled in the unloading direction and a side of the bottom opening which is proximal the shelf edge relative to the transverse direction.

In the illustrated arrangement the body contact support surface of the unloading arm is rounded around an axis oriented transversely to a direction in which the unloading arm is elongated. In the illustrated arrangement this axis is substantially horizontal and substantially parallel to the longitudinal direction of the shelf.

In the illustrated arrangement the body contact support surface of the unloading arm is fixed in relation to the transverse axis of the unloading arm. Thus the body contact support surface is not a circumferential outer surface of a roller mounted for rotation around its own axis.

BRIEF DESCRIPTION OF THE DRAWINGS

The invention will now be described in conjunction with the accompanying drawings in which:

FIG. 17 is an enlarged side elevational view of the arrangement of FIG. 1 showing more clearly a catch thereof when the body locating member positioned near the ground surface.

In the drawings like characters of reference indicate corresponding parts in the different figures.

DETAILED DESCRIPTION

Figure 1:
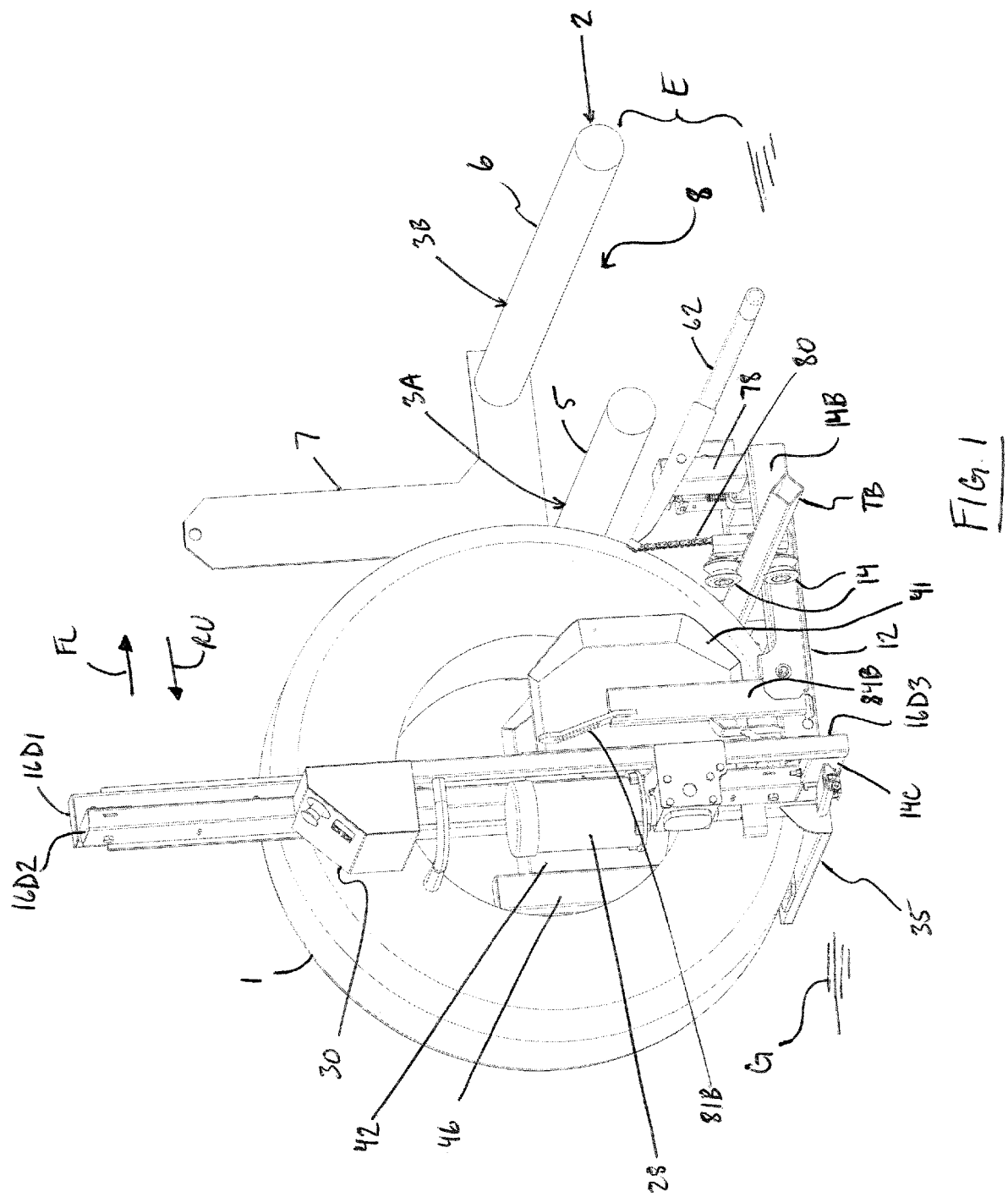
FIG. 1 is a perspective view of an arrangement of apparatus according to the present invention with a tire defining a round body positioned for loading, and a body locating member arranged substantially at a ground surface.
Figure 2:
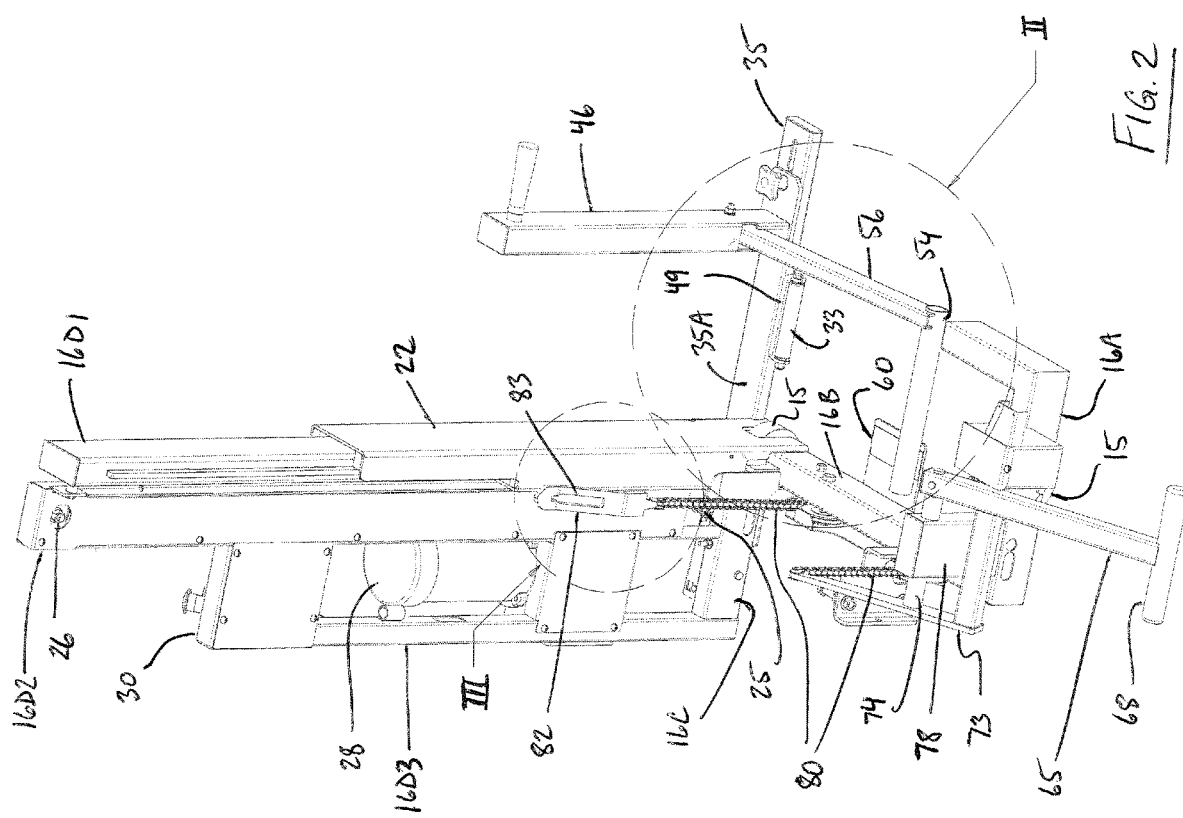
FIG. 2 is a perspective view of the arrangement of FIG. 1 in isolation and with some components for example lateral support plates omitted for clarity of illustration.
Figure 3:
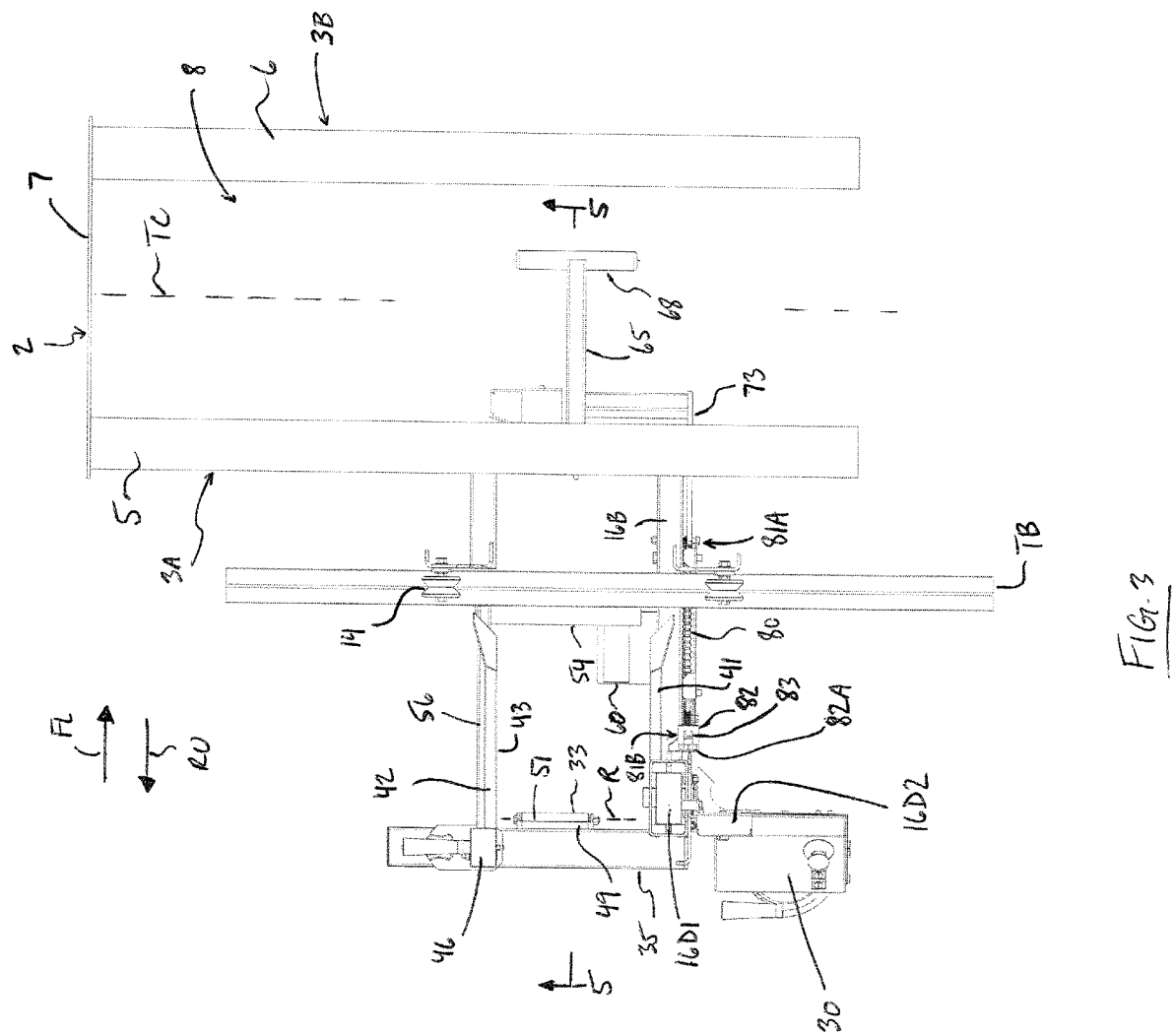
FIG. 3 is a top plan view of the arrangement as shown in FIG. 1 but without the tire.

The accompanying figures show an apparatus 10 suited for both loading and unloading a round body, which is rounded around a rotational axis B of the round body, for example a tire 1 or a wheel comprising a tire mounted on a rim, relative to a stationary shelf 2. Loading and unloading is performed with the round body in upstanding condition in which the rotational axis B is oriented substantially horizontally so that the round body is enabled to roll across a ground surface G, for example a floor of a warehouse.

The shelf 2 shown in the figures is wholly located at a spaced position above the ground surface, and comprises a shelf edge 3A across which the tire 1 defining the round body is passed during loading and unloading thereof. The shelf edge 3A extends in a longitudinal direction of the shelf and is spaced above the ground surface G.

In the illustrated arrangement the shelf is formed by a pair of parallel tubes 5 and 6 oriented with their axes, around which the tubes are rounded, extending in the longitudinal direction of the shelf and spaced from one another in a transverse direction of the shelf crosswise to the longitudinal direction. The tubes 5, 6 are mounted on a pair of longitudinally spaced brackets 7 (only one shown for clarity of illustration) each shaped like an inverted 'T' with a base of this 'T' extending in the transverse direction of the shelf and to which the tubes 5, 6 are attached. Each one of the brackets 7 is coupled to a vertical track (not shown) oriented in an upright plane so that the shelf and several others like it can be moved to and from an access position in which the tires can be placed onto or removed from the respective shelf, in which the shelf is spaced above 19 inches above the ground surface. Thus the shelf of the illustrated arrangement forms part of a vertical tire carousel which is not shown or described in its entirety herein as the carousel is not the focus of the present disclosure.

Therefore the shelf edge 3A across which the tire passes in loading and unloading movement is defined by an outer portion of a circumferential surface of one of the tubes 5.

Figure 4:
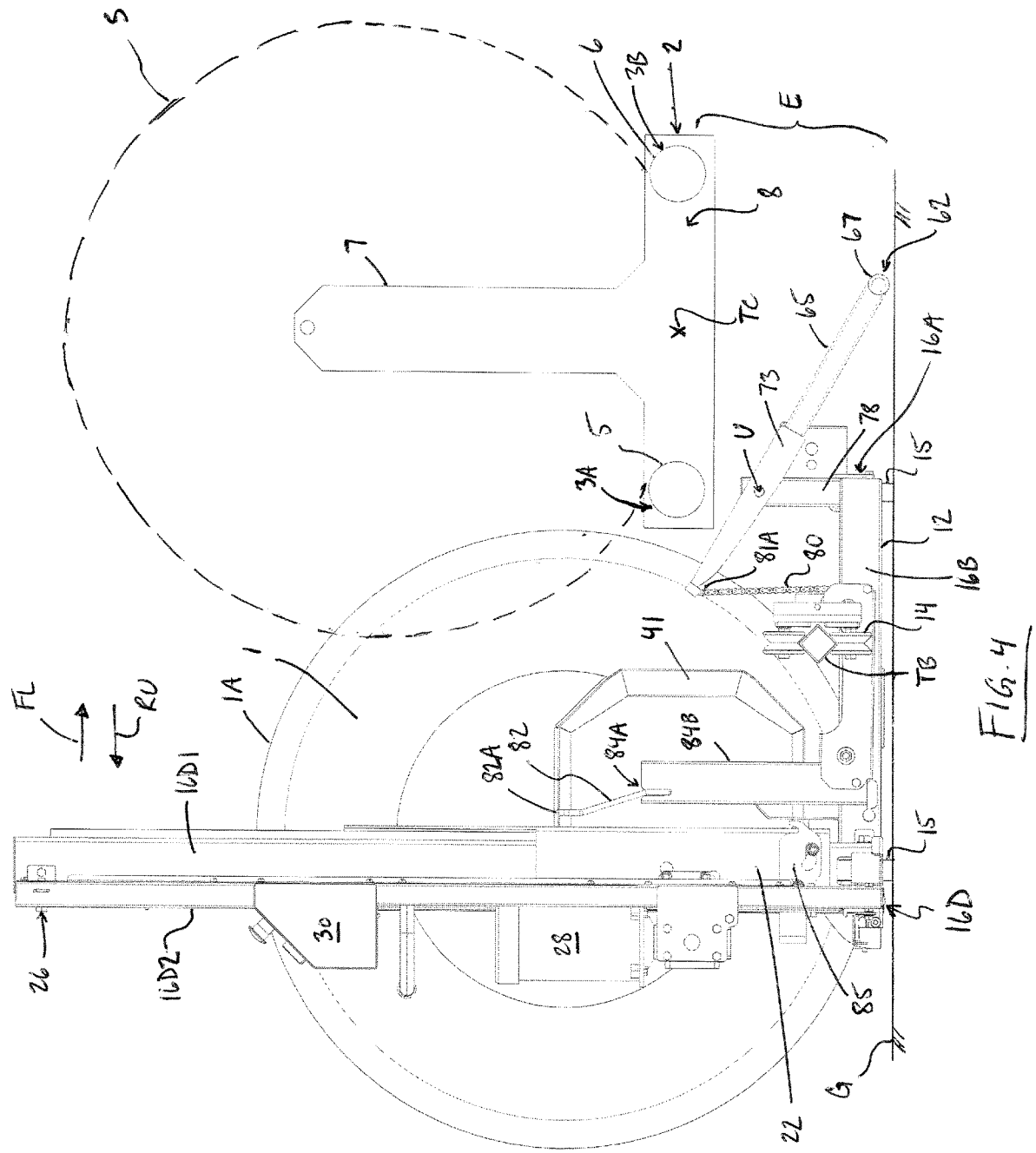
FIG. 4 is a side elevational view of the arrangement of FIG. 1 from the same side shown in FIG. 1.

A shelf storage space S (shown in stippled line in FIG. 4) where the tire 1 resides when disposed in a storage position on the shelf is defined vertically above the shelf, and in the illustrated arrangement extends transversely beyond each of the tubes 5, 6 because the tubes are mounted at a distance from one another which is smaller than a diameter of the tire such that a portion of the tire extends transversely horizontally beyond the tubes in the storage position of the tire.

Furthermore, the shelf 2 defines a bottom opening 8 which in the illustrated arrangement is delimited by inner sides of the tubes 5, 6 and by inner sides of the opposite brackets 7. The bottom opening 8 is located centrally with respect to the transverse direction of the shelf and is spaced in the transverse direction from the shelf edge 3A on an access side of the shelf and from an opposite longitudinally extending terminus 3B of the shelf defined by an outer portion of a circumferential surface of the other tube 6. Thus the bottom opening 8 is suited for locating the tire 1 transversely centrally of the shelf in the shelf storage space. The bottom opening allows for an exterior space E beneath the shelf to be communicated with the shelf storage space above the shelf, so that an object can be passed through the opening 8 from a position beneath the shelf to a position above the shelf.

The apparatus 10 comprises a frame 12 adapted for resting on the ground surface G. The frame 12 rotatably supports a plurality of track rollers 14 at spaced locations relative to both the longitudinal direction and the transverse direction, which are adapted for rolling movement along a track TB in the form of a diamond-shaped tube extending longitudinally of the shelf. The track bar TB is fixedly mounted for example to a frame of the tire carousel so as to be located at a height above the ground surface G but below the shelf edge 3A. Additionally the track bar is supported at a spaced location from the shelf edge 3A with respect to the transverse direction. The track rollers 14 are oriented with respective roller axes perpendicular to the longitudinal direction of the shelf so that the frame carrying a remainder of the loading/unloading apparatus 10 is displaceable relative to the shelf along a predetermined path defined by the track bar TB. A plurality of ground rollers 15 are rotatably supported on the frame at spaced locations relative to the transverse direction with their axes oriented in the transverse direction so as to support the frame in rolling movement across the ground surface G when guided along the track bar. As such the apparatus is repositionable at the shelf edge 3A at various locations with respect to the longitudinal direction so that a plurality of tires can be loaded onto the shelf each beside the next.

The frame includes a proximal frame member 16A located below the shelf beneath the tube 5 on the access side of the shelf. The proximal frame member 16A extends in the longitudinal direction of the shelf, and there is further provided an intermediate frame member 16B oriented perpendicularly to the longitudinal direction of the shelf spanning from the proximal frame member 16A to a distal frame member 16C. The distal frame member 16C extends in the longitudinal direction of the shelf and is parallel to the proximal member 16A. A set of vertically upstanding frame members 16D are supported on the interconnection and distal frame members 16B, 16C at spaced location from the shelf edge 3A relative to the transverse direction.

The apparatus for loading the round body includes a body lifting arrangement 20 for raising and lowering the round body relative to the shelf edge. The body lifting arrangement is supported on a pair of members 16D1 and 16D2 of the set of vertically upstanding frame members, and comprises a carrier 22 adapted for vertically upward and downward movement along the vertically upstanding member 16D1 which forms a vertically upright linear track. The carrier thus forms a sleeve circumferentially encompassing the vertically upstanding member which has a rectangular cross-section and which extends along a vertically upstanding axis. The carrier 22 is driven for movement along the track 16D1 by a drive chain 24 forming an endless loop about a pair of vertically spaced parallel axes defined by sprockets 25, 26 rotatably mounted on a second vertically upstanding member 16D2 which is adjacent the first member 16D1 forming the carrier's track. The carrier thus is operatively coupled horizontally across a gap between the first and second vertically upstanding frame members 16D1 and 16D2 to a fixed location along the endless drive chain such that rotation of the chain in a first prescribed rotational direction causes the carrier to be displaced upwardly along the track, and chain rotation in an opposite rotational direction causes the chain to be displaced downwardly along the track 16D1. A motor 28 is provided, mounted on the frame adjacent the drive chain 24, and operatively coupled to the chain so as to effect rotation of the chain in its vertically upright plane of rotation. A controller 30 mounted on the frame between the vertically upstanding members 16D2 and 16D3 is operatively coupled to the motor 28 so as to control a direction of rotational movement of the drive chain for displacing the carrier upwardly and downwardly.

To the carrier is coupled a body locating member which serves to locate the round body in a prescribed location relative to the shelf for loading. The body locating member comprises a roller 33 mounted on a horizontally oriented support beam 35 cantilevered from the carrier in the longitudinal direction parallel to the shelf edge 3A, which defines a support framework of the body lifting arrangement. The body locating roller 33 is located adjacent an inner side of the support beam 35 which is proximal to the shelf edge 3A, and is mounted in spaced relation to the beam so that the roller is enabled to freely rotate about its roller axis R which is oriented horizontal and parallel to the longitudinal direction of the shelf. In the illustrated arrangement a top of the circumferential outer surface 38 of the body locating roller is located below a top 35A of the cantilevered support beam, across which the round body is passed in order to be positioned in an initial loading position which will be described in more detail shortly.

The body locating roller 33 is wholly located in spaced relation in the transverse direction of the shelf from the shelf edge 3A, and the circumferential outer surface 38 of the body locating roller defines a body support surface of the body locating member for engaging the outer surface 1A of the round body. The body support surface acts to locate the round body in contact with the shelf edge 3A so that the round body 1 is confined in fixed location between the body locating member and the shelf edge during the loading procedure. Generally speaking, the body support surface is located on an inner side of the body locating member proximal the shelf edge 3A; however, as the body locating member of the illustrated arrangement comprises the roller which is supported for rotational movement around its roller axis R, any portion of the circumferential outer roller surface 38 can be located at an innermost end of the roller proximal the shelf edge 3A which defines the inner side of the body locating member. Therefore a whole of the circumferential outer surface 38 of the roller effectively defines the body support surface when presented on the inner side of the body locating member.

The body locating roller 33 via its mounting to the cantilevered support beam 35 is thus movably carried on the carrier 22 of the body lifting arrangement, which is operable to displace the roller 33 in upward and downward movement along the vertical track 16D1 so as to be movable relative to the shelf 2 which is held stationary during loading. Thus the round body is lifted to a height from which the body can then be displaced into the shelf storage space S of the shelf while being maintained in the fixed location between the outer roller surface 38 and the shelf edge 3A.

It will be appreciated that in the illustrated arrangement, the round body when initially passed over the top 35A of the cantilevered beam so as to be engaged and supported by the body locating roller 33 is disposed in contact with the track bar TB which is located intermediate the roller 33 and the shelf edge with respect to the transverse direction and at a height where the track bar can contact the round body in its path from the ground surface to the shelf storage space. Since the track bar is located at a fixed height above ground surface G, during upward movement of the body locating member relative to both the track bar and shelf edge the round body is displaced into a position in which it is eventually supported between the body locating roller and the shelf edge 3A.

Since the shelf edge 3A is in a fixed location because the tube 5 defining same is mounted in fixed rotational orientation with respect to the brackets 7, and therefore does not rotate, the body locating roller 33 rotates during upward movement of the carrier to raise the round body while the body is maintained in contact with the shelf edge 3A so as to avoid binding of the apparatus during loading due to friction of the round body with the shelf edge, as in the illustrated arrangement the tire is not suited for sliding movement across the shelf edge. Thus, during lifting, the round body 1 rotates about a reference point which is defined by the shelf edge 3A.

Additionally to the body locating member, a pair of lateral support plates 41, 42 are mounted in upstanding parallel spaced condition relative to one another so that each defines a vertically upright inner surface 43 in opposite spaced relation to that of the other one for receiving and maintaining the round body in its upstanding condition when the body is confined in fixed location between the body support surface and the shelf edge 3A. One of the lateral support plates 41 is mounted to the carrier 22 of the body lifting arrangement and extends from the carrier towards the shelf edge in a forward loading direction FL. The other lateral support plate 42 is mounted on a vertically upright post 46 which in turn is mounted to the cantilevered beam 35 of the body lifting arrangement. The support post 46 is adapted for sliding movement longitudinally of the beam 35 so as to be slidingly supported thereon and movable relative to the first support plate 41 whose location relative to the frame 12 of the apparatus is fixed with respect to the longitudinal direction of the shelf. Thus the support post 46 carrying the plate 42 can be displaced along the cantilevered beam 35 so as to increase or decrease a spacing between the inner surfaces 43 of the plates for accepting different widths of round body. The second support plate 42 also extends in the forward loading direction FL from the support post 46 so that its free distal end, in relation to the post 46, is located closer to the shelf edge 3A than the movable support post. As such the support surfaces 43 are located substantially between the body locating roller 33 and the shelf 3A relative to the transverse direction of the shelf.

The body locating roller 33, which is movably carried on the carrier 22 of the body lifting arrangement, is displaceable relative to the shelf edge 3A in upward and downward movement between a lowered condition of the body locating roller and a raised condition thereof, with respect to the shelf edge. In the lowered condition the body support surface defined by the roller 33 is located below the shelf edge 3A as shown for example in FIGS. 1, 4 and 7-8 so that the roller is located at a suitable height above the ground surface G for passing the round body from one side of the body locating roller which is distal to the shelf edge to the other side proximal thereto into the initial loading position. That is, in the initial loading position the round body is received between the outer roller surface 38 and the shelf edge 3A, and the body 1 is also received between the lateral support plates 41, 42 which maintain the body in the upstanding condition during loading. Typically, when the round body is disposed in the initial loading position the body locating member is positioned as closely as possible near the ground surface G such that the round body can be suitably rolled from the ground surface G to the top 35A of the support beam 35 and across same and the roller 33 to a location adjacent the shelf edge 3A. Furthermore, since the track bar TB of the illustrated arrangement is positioned at a location where it seemingly interferes with placement of the round body between the body locating member and the shelf edge, in the illustrated arrangement there is a range of heights relative to the ground surface G with the lower limit of this range at zero where the round body is in contact with the outer roller surface and the track bar TB, until the roller 33 is elevated to a certain height above the ground surface G (though still disposed in the lowered condition relative to the shelf edge) where the round body contacts the shelf edge 3A and remains in contact therewith for the remainder of the loading procedure.

Figure 11:
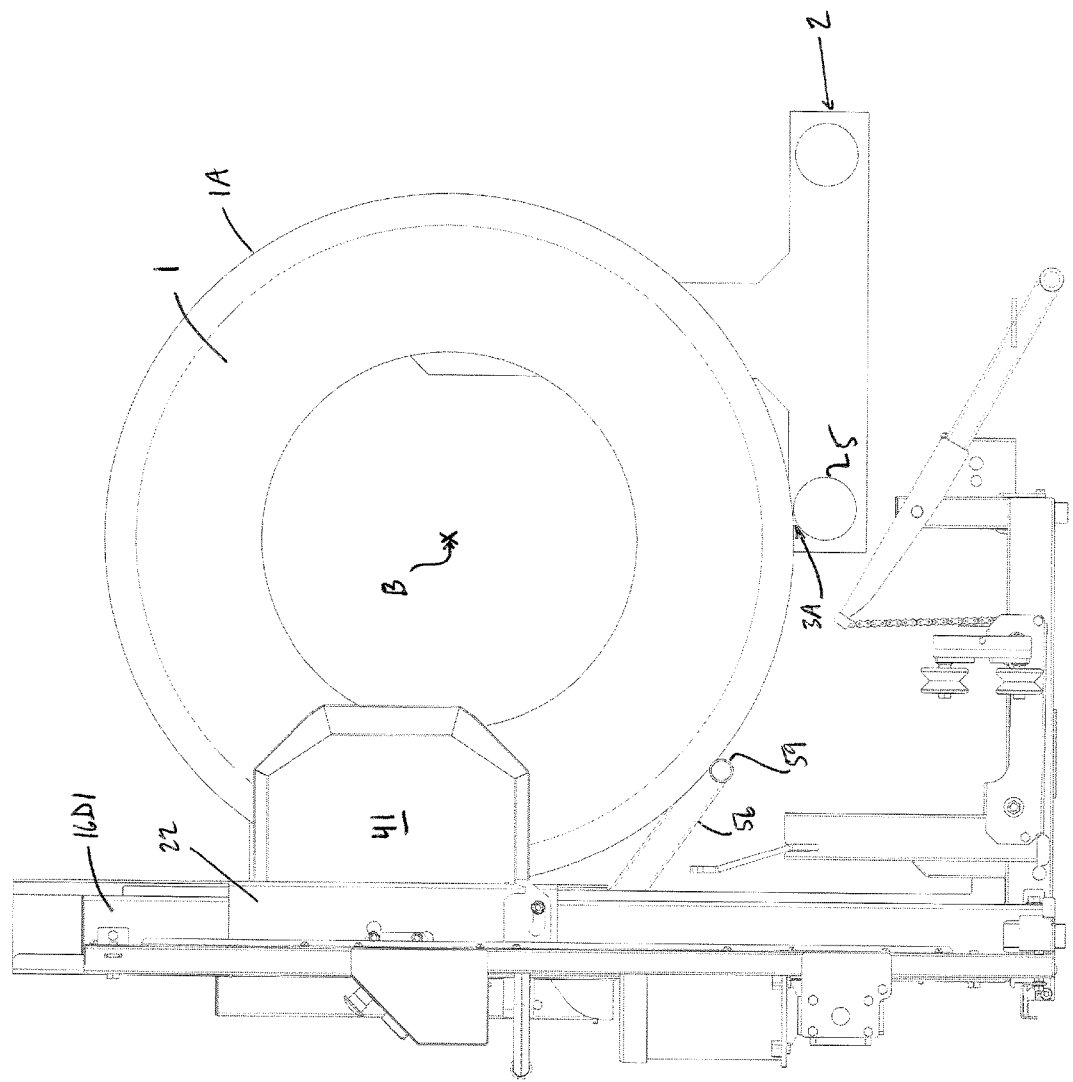
FIG. 11 is a side elevational view of the arrangement of FIG. 1 in which the body locating member is in a raised condition with the transition member in contact with the tire.

In the raised condition the body locating roller 33 is located above the shelf edge 3A as shown for example in FIG. 11. The body locating roller traverses a vertically linear path from the lowered condition to the raised condition such that its location relative to the shelf edge in the transverse direction does not change from one of the lowered and raised conditions to the other. By its movement from the lowered condition to the raised condition the body locating roller cooperates with the shelf edge 3A, which remains stationary and thus in fixed location relative to the ground surface G throughout this movement of the body locating member, to lift the round body 1 from the ground surface G or a position adjacent same and roll the body over the shelf edge 3A onto the shelf to place it within the shelf storage space where the body is now in a storage position on the shelf.

Figure 5:
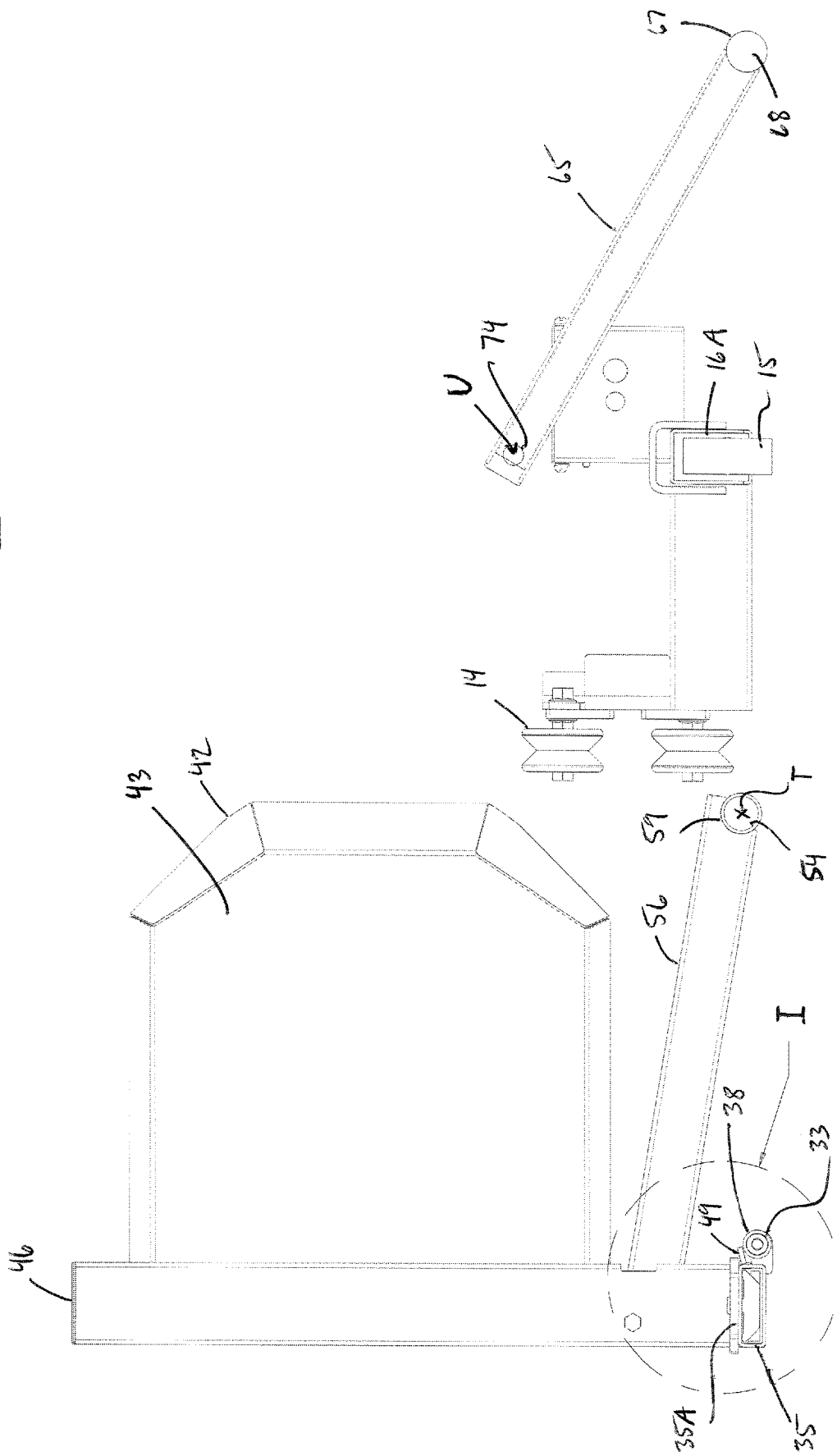
FIG. 5 is a cross-sectional view along line 5-5 in FIG. 3.
Figure 6:
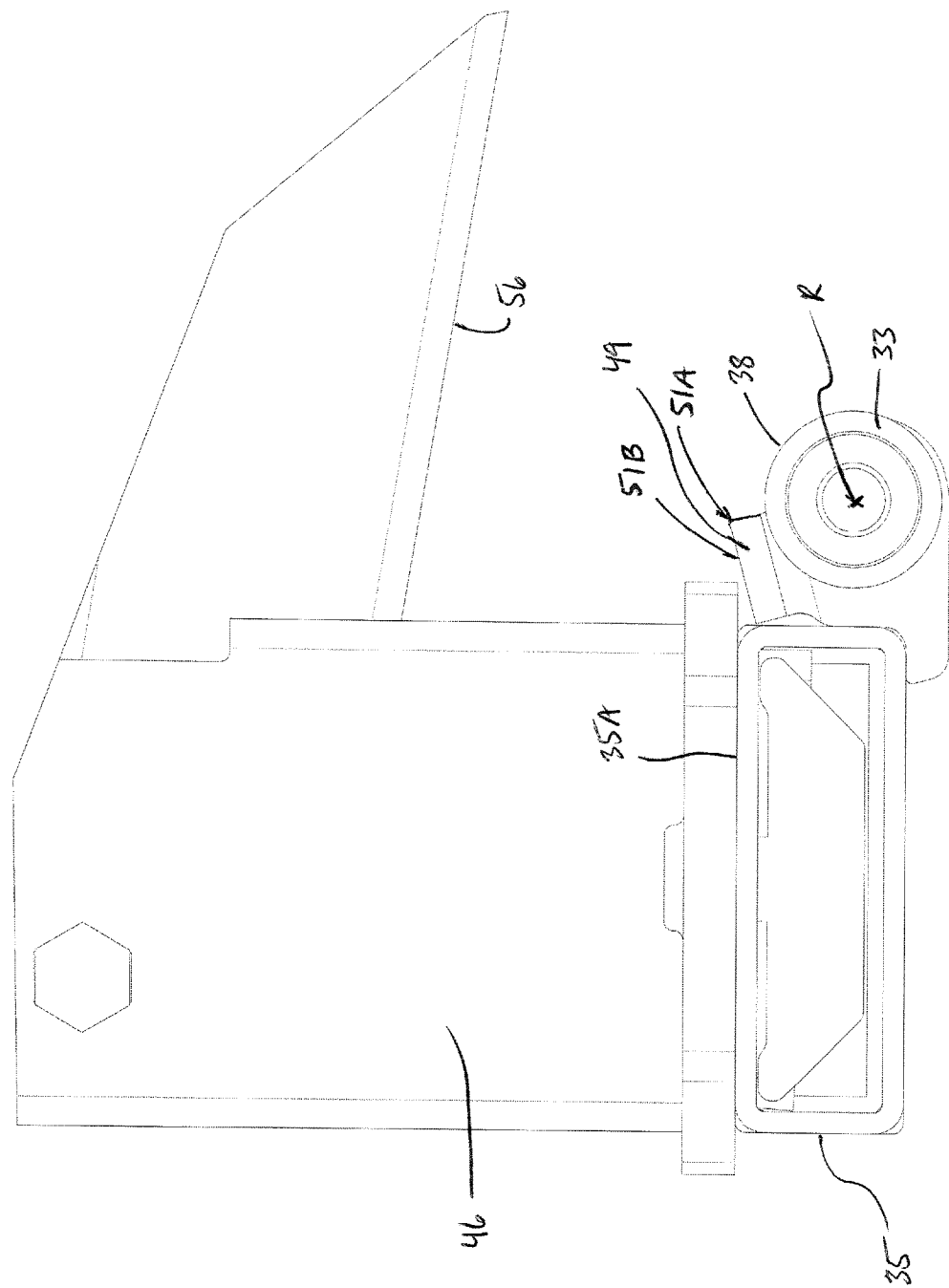
FIG. 6 is an enlarged partial view indicated at I in FIG. 5.
Figure 7:
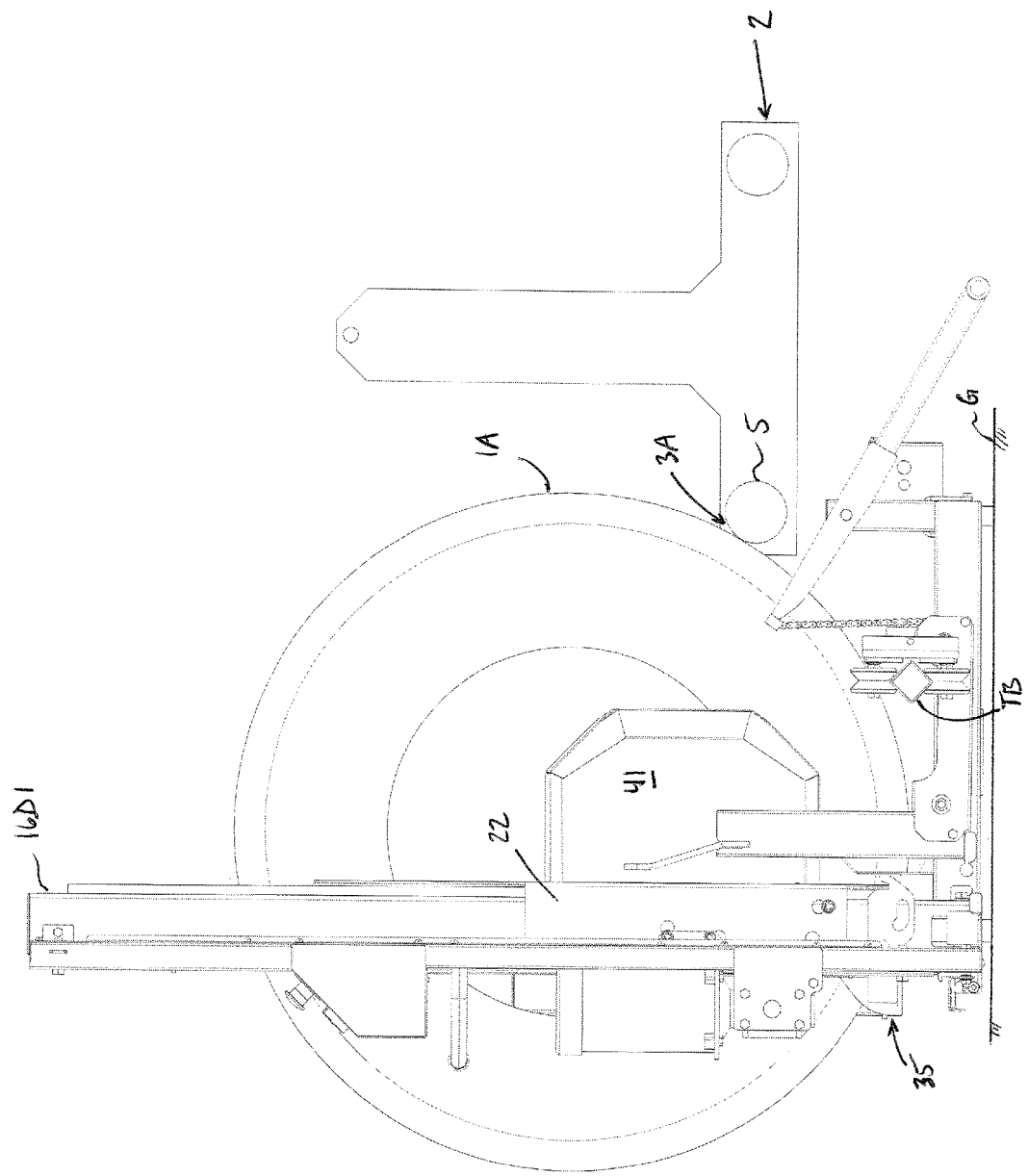
FIG. 7 is a side elevational view of the arrangement of FIG. 1 showing the tire lifted above a ground surface.
Figure 8:
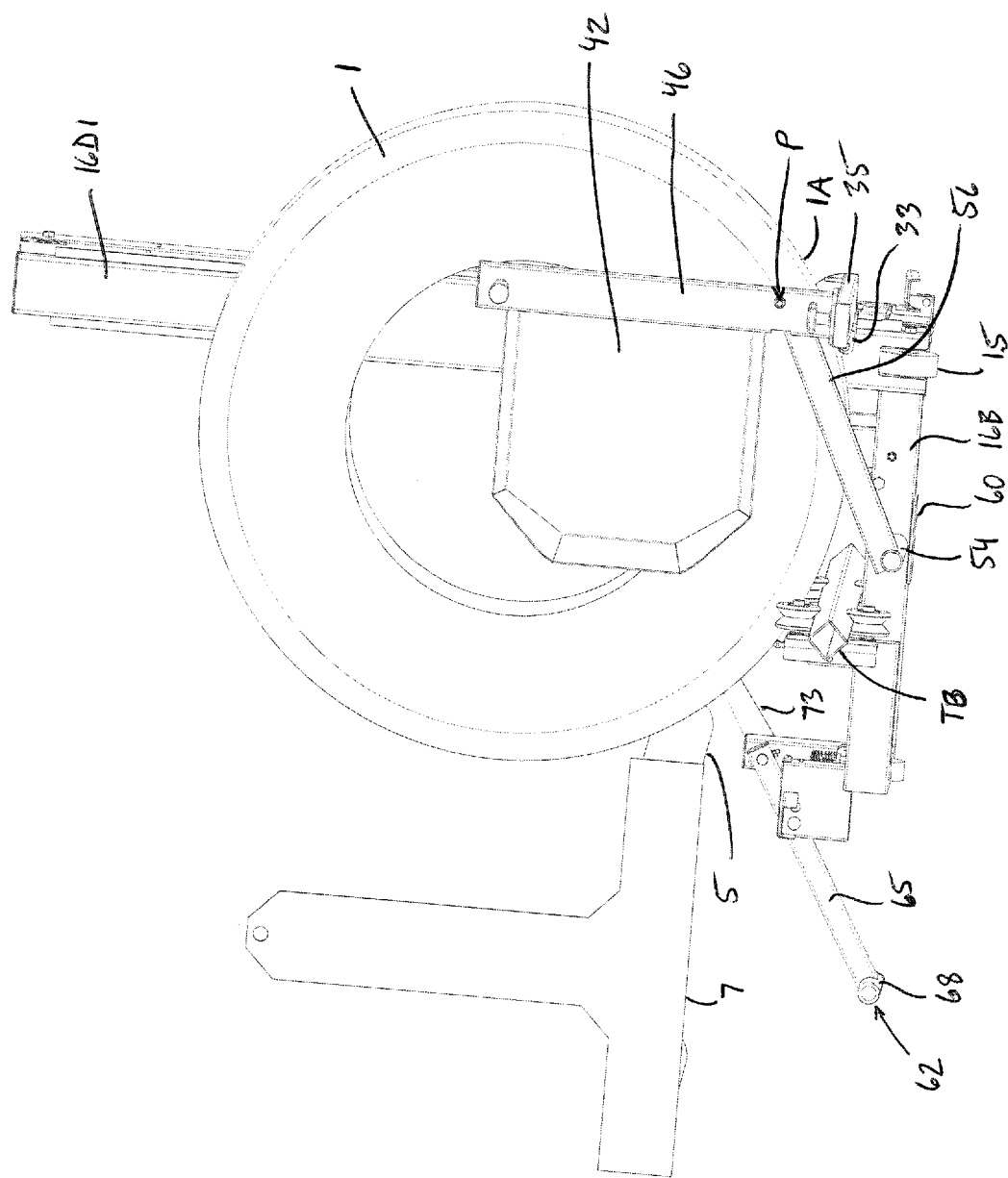
FIG. 8 is a perspective view from an opposite side of the arrangement of apparatus to that shown in FIG. 7.
Figure 9:
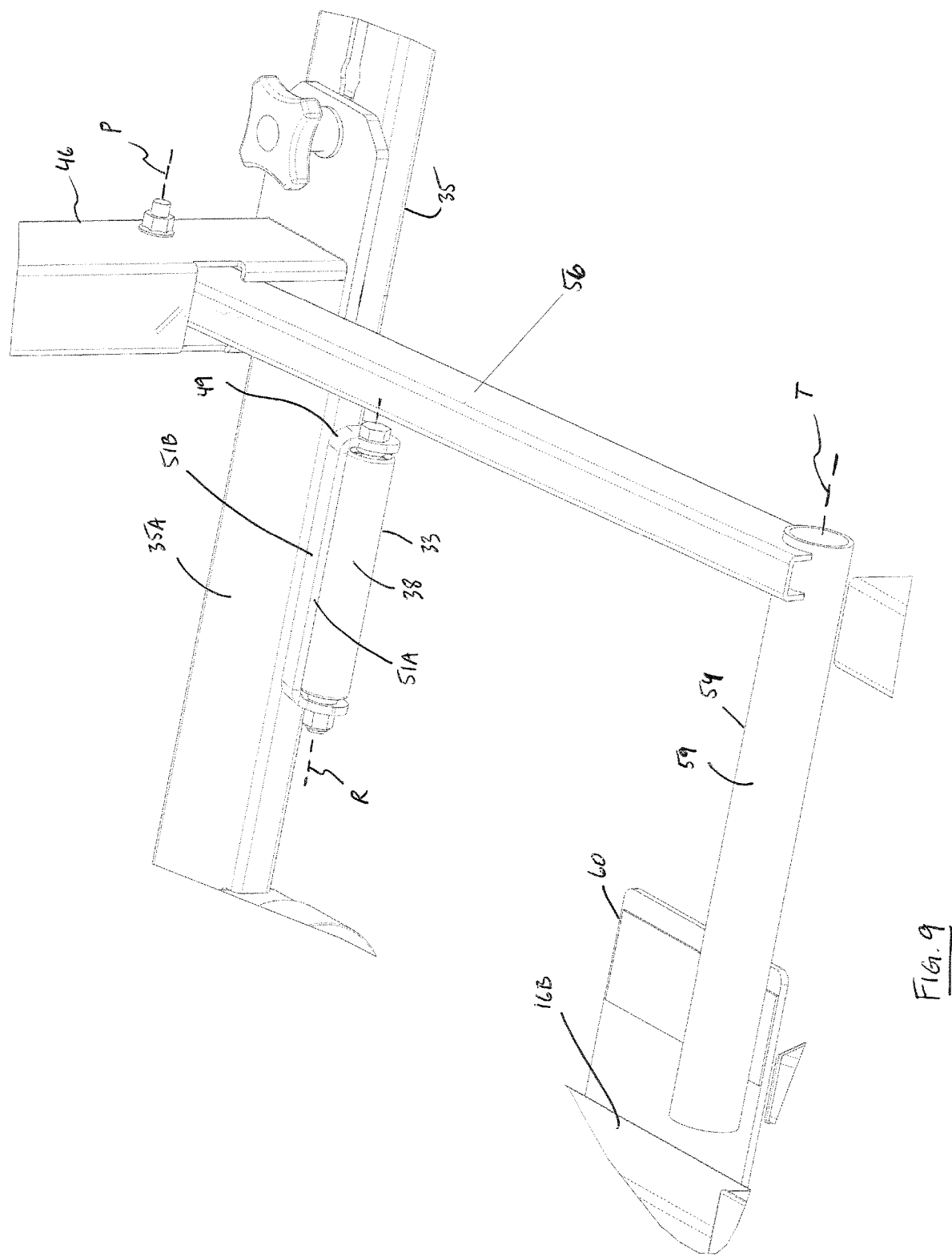
FIG. 9 is an enlarged partial view indicated at II in FIG. 2 showing more clearly a body locating member and a transition member of the arrangement of FIG. 1.
Figure 10:
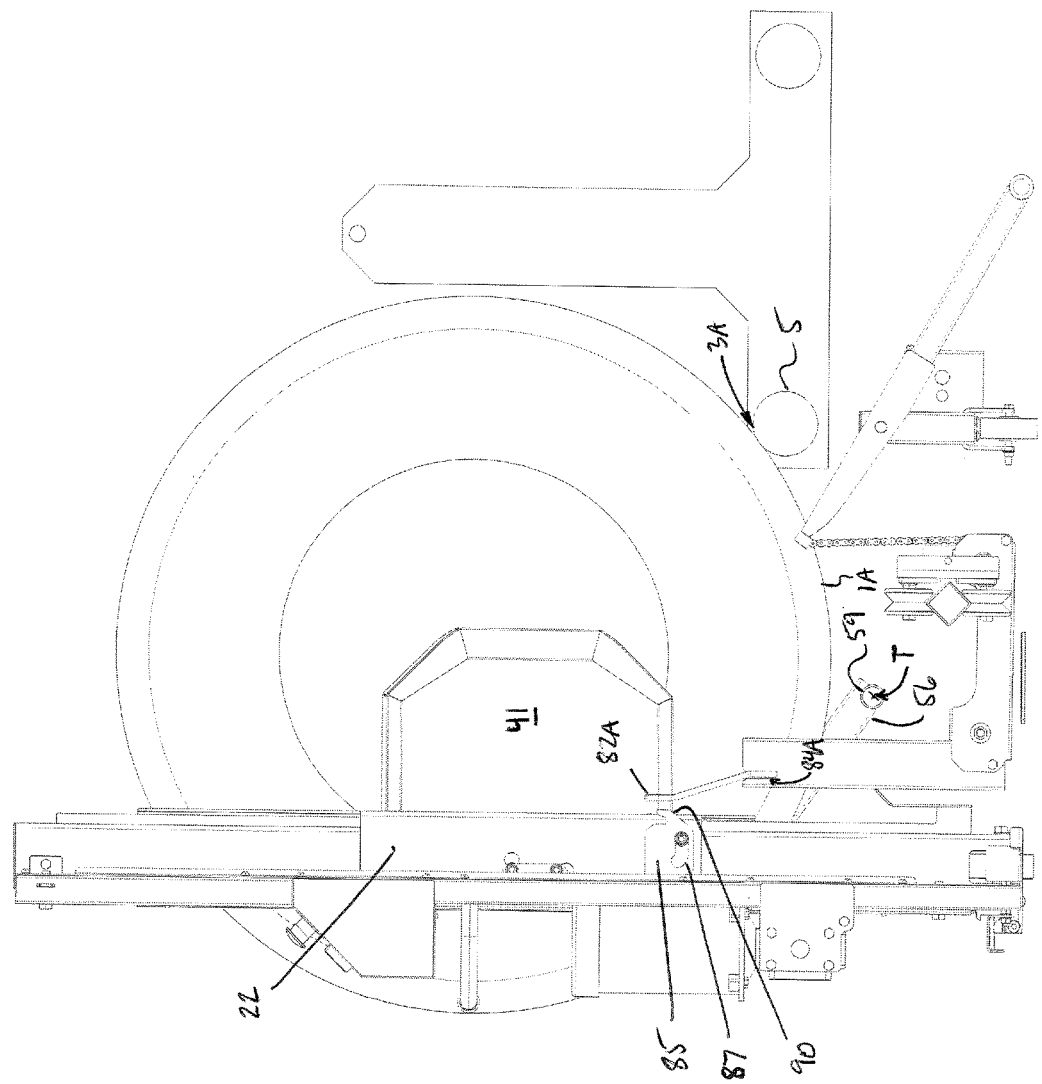
FIG. 10 is a side elevational view of the arrangement of FIG. 1 in which the body locating member is elevated above the ground surface but the transition member is not yet in contact with the tire, and some components are omitted for clarity of illustration.

The use of the body locating roller 33 in the illustrated arrangement to provide the body support surface of the body locating member may render more difficult a removal of the round body 1 in the upstanding condition from the initial loading position. Rolling the body in a rotational direction so as to cause the body's rotational axis B to be displaced in a rearward unloading direction RU alone may not be sufficient to remove the round body from the apparatus, as the body locating roller 33 simply acts to rotate in a rotational direction opposing the rotational direction of the body, thus acting to maintain the body in the initial loading position. Thus is provided a traction plate 49 mounted to the cantilevered beam 35 in a position above the body locating roller 33 so as to define a free longitudinal edge 51A which provides a fixed traction surface that is positioned to engage the outer surface 1A of the round body when the body 1 is displaced in the rearward unloading direction RU opposite the forward loading direction FL. This is more clearly shown in FIGS. 5 and 6.

The traction plate 49 is a fixed member carried by the body lifting arrangement that locates the free traction edge 51A distal to the cantilevered beam 35 and spaced therefrom in the transverse direction towards the shelf edge 3A (i.e., the forward loading direction). Thus the traction edge 51A is arranged at a spaced location relative to the roller which is vertically above the circumferential outer roller surface 38 and which, with respect to the transverse direction of the shelf, is spaced in the rearward unloading direction (in an outward direction away from the shelf edge) from each of the roller axis R and the innermost end of the body locating roller so as to be located intermediate the roller axis R and an outermost end of the roller which is distal to the shelf edge 3A (and thus proximal the cantilevered beam 35). The traction edge 51A extends in the longitudinal direction of the shelf and is parallel to the roller axis R.

In addition to the traction edge the traction plate also defines an upper support surface 51B which extends from the traction edge 51A downwardly and in the rearward unloading direction, so as to extend away from the innermost end of the roller 33, to an opposite terminus of the upper surface which is located at the cantilevered beam 35 but slightly below a horizontal plane defined by its top 35A. A top of the traction edge 51A is still located above the top 35A of the cantilevered beam. Thus the upper support surface 51B of the traction plate and the top 35A of the cantilevered beam 35 are substantially contiguous so as to collectively form a continuous surface across which the round body is rolled from a position located outwardly of the apparatus on a distal side of the cantilevered support beam 35, with respect to the shelf edge 3A, to the initial loading position on a proximal side of the support beam 35 relative to the shelf.

As described previously, the body locating member is disposed on the apparatus at a distance from the shelf edge 3A. This prescribed distance typically is selected so that the body remains in a substantially uniform unchanged upstanding condition during movement from the lowered condition to the raised condition of the body locating member so as to minimize any movement of the body that is not of the rotational type around the body axis B. To ensure the round body still is able to pass over the shelf edge 3A out of the initial loading position and into the storage position, there is provided a transition support member in the form of a cylindrical bar 54 fixedly mounted on an interconnection link 56 extending from the support post 46 generally in the forward loading direction beyond the body locating roller 33 so as to locate the transition bar 54 at a spaced location from the roller 33 intermediate same and the shelf edge 3A.

The interconnection link 56 is located beneath the support plate 42 such that an inner side surface of the link is spaced from the inner surface 43 of plate 42 relative to the longitudinal direction but away from a space defined between the support plates 41, 42 where the round body is carried by the apparatus 10 during loading, such that the link is clear of the round body when the body is received between the lateral support plates. The transition bar 54 is connected at this inner side surface of the link 56 so as to be presented in adjacent and opposite relation to the body locating roller with respect to the transverse direction.

Figure 12:
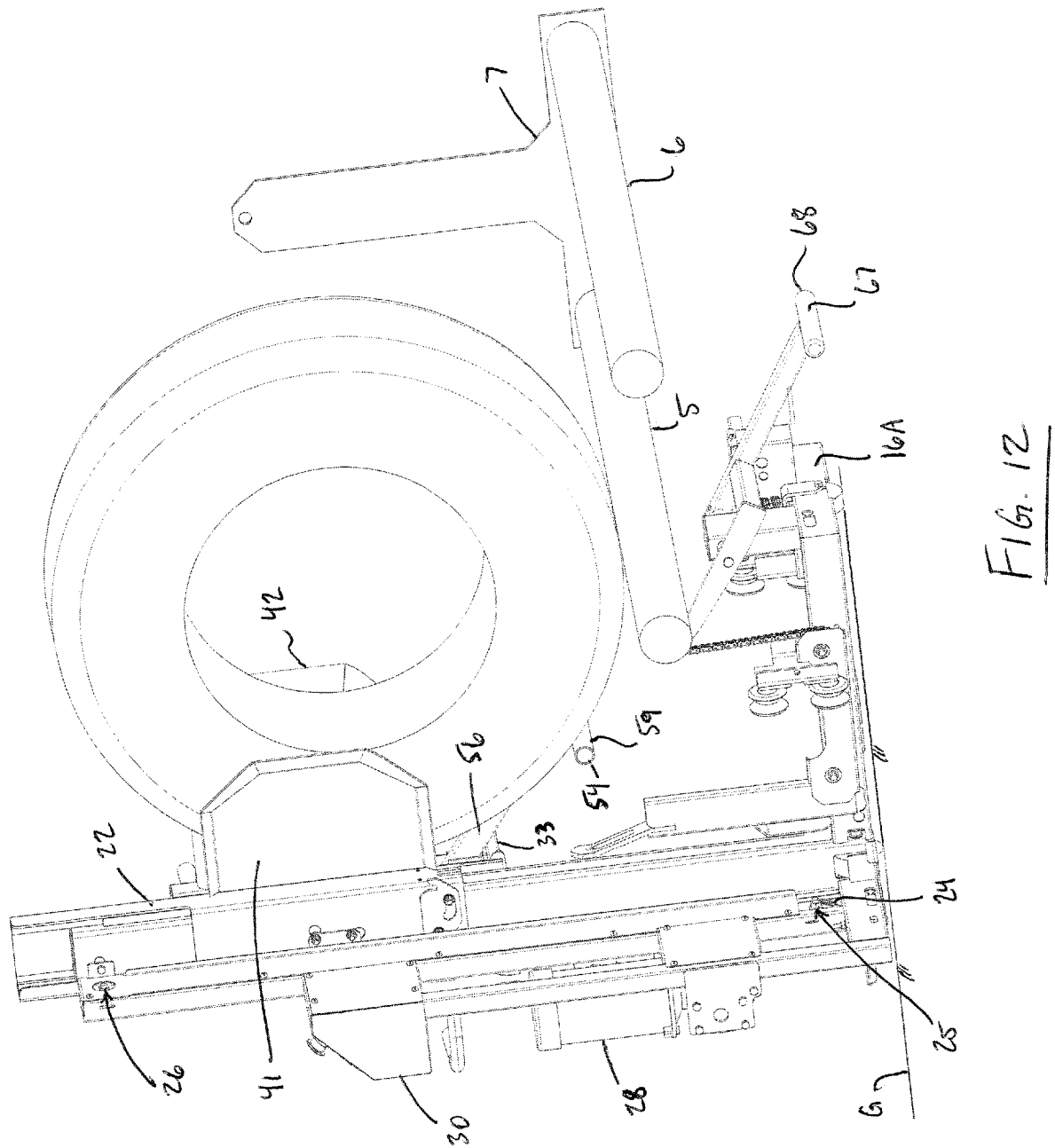
FIG. 12 is a perspective view from the same side of the arrangement of apparatus as that shown in FIG. 11.
Figure 13:
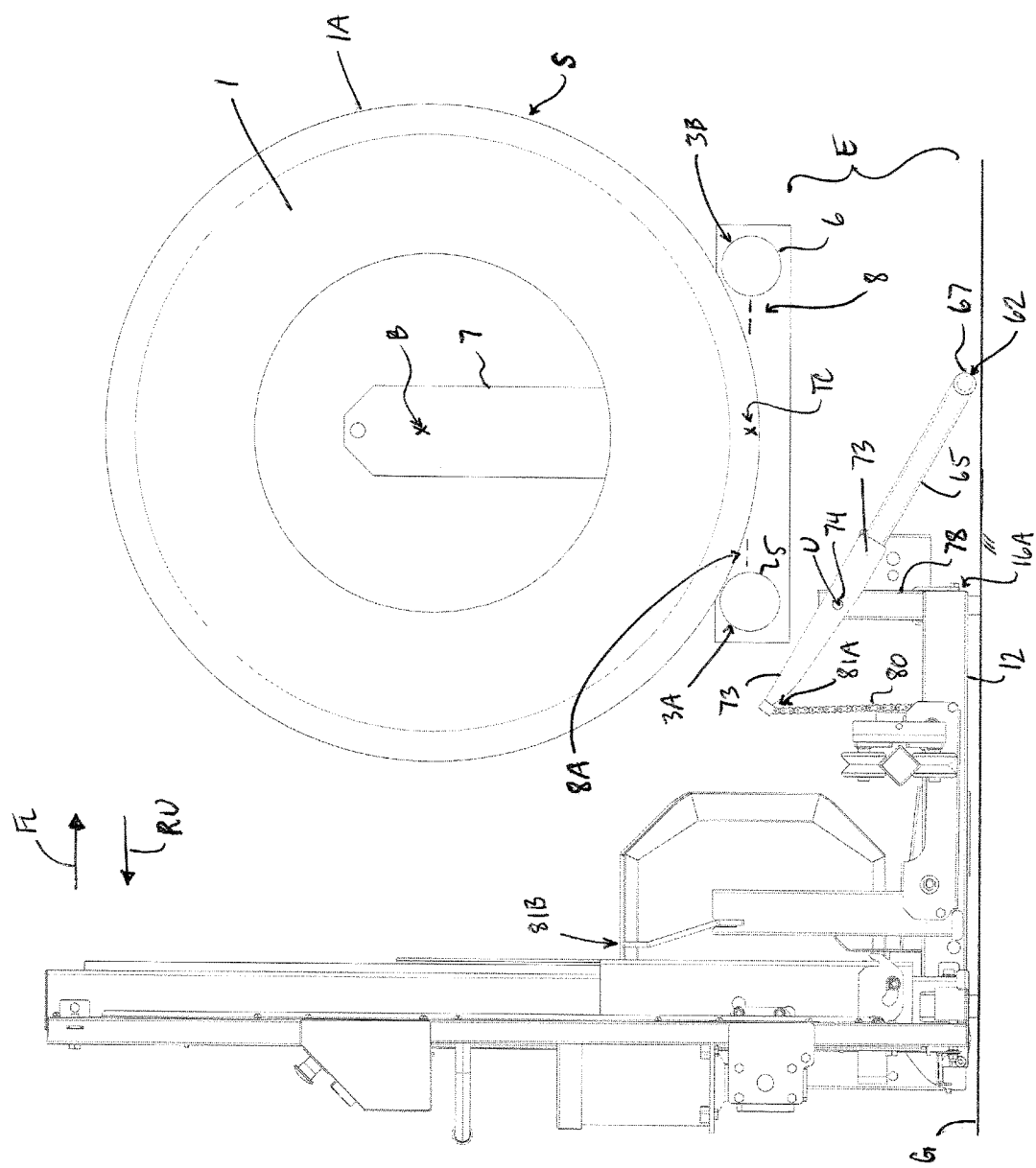
FIG. 13 is a side elevational view of the arrangement of FIG. 1 in which the tire is received on the shelf in a storage position, the body locating member is arranged substantially at a ground surface, and an unloading arm is in an idle position.
Figure 14:
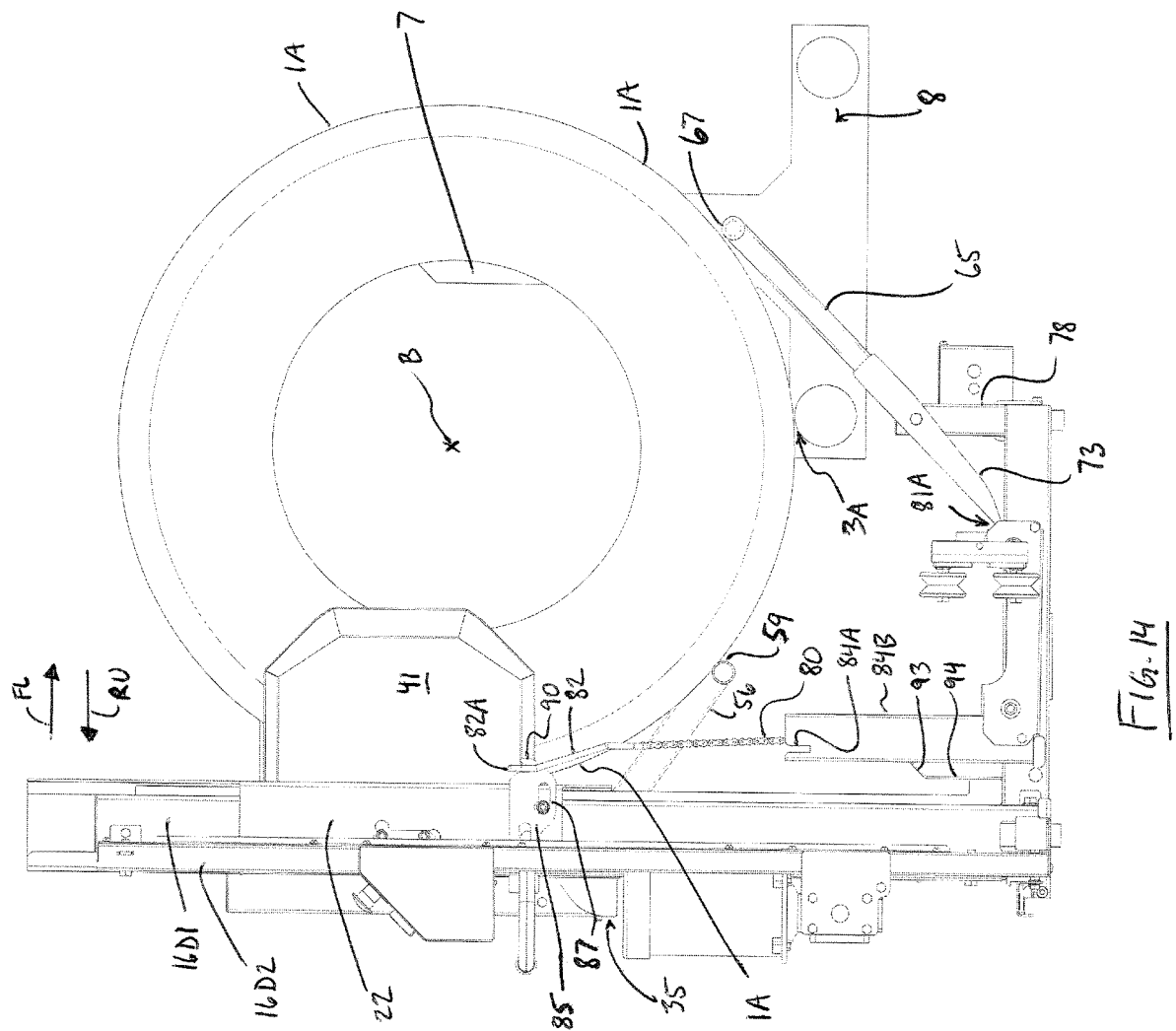
FIG. 14 is a side elevational view of the arrangement of FIG. 1 with the tire being displaced from the storage position and transferred from the unloading arm to the body locating member.
Figure 15:
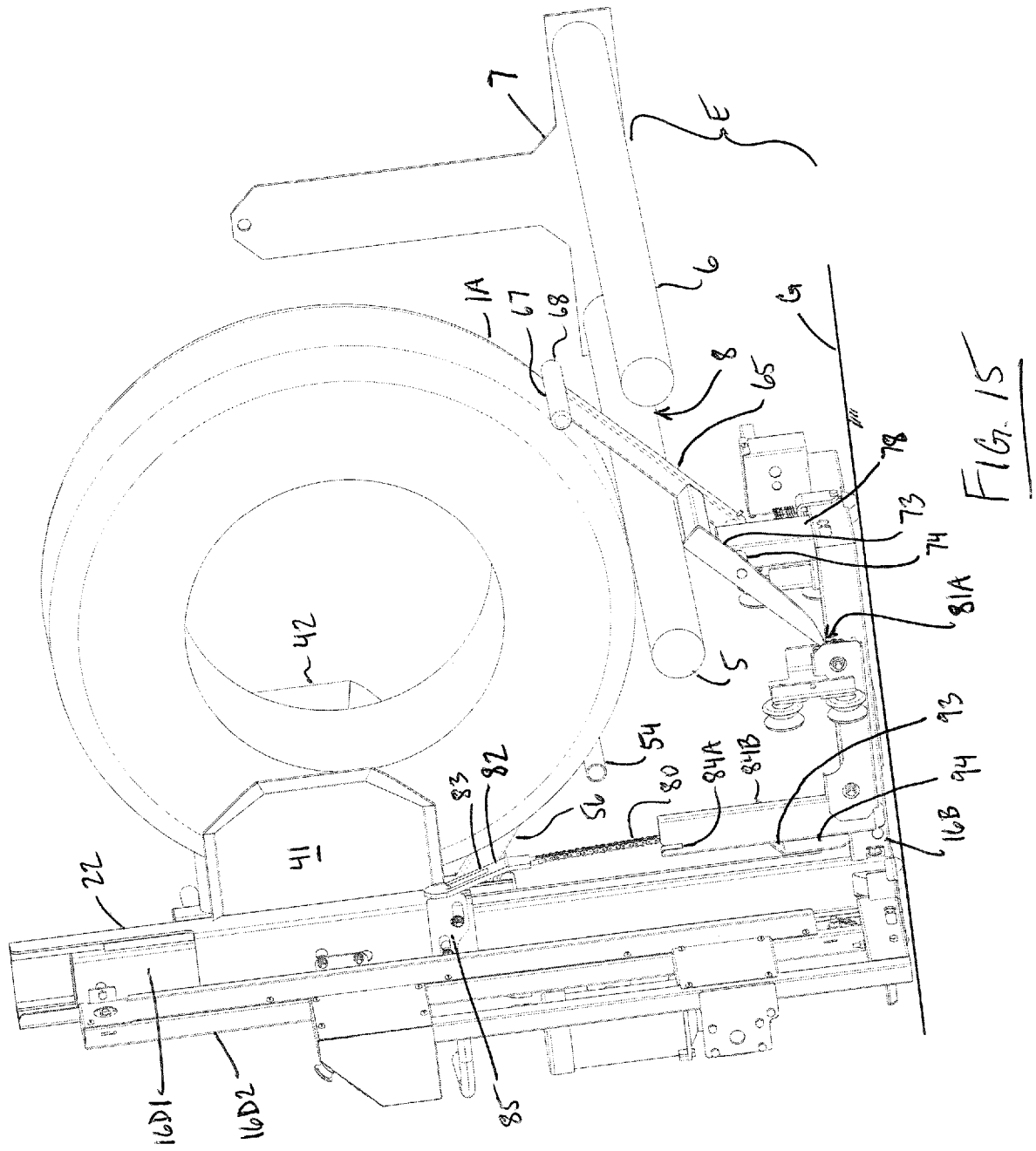
FIG. 15 is a perspective view from the same side of the arrangement of apparatus as that shown in FIG. 14.
Figure 16:
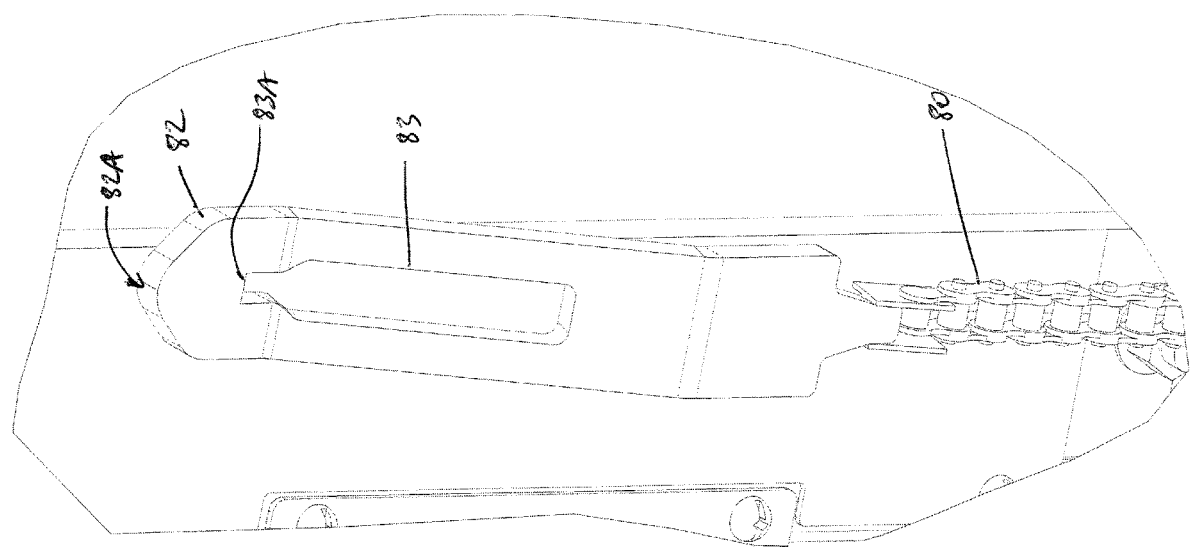
FIG. 16 is an enlarged partial view indicated at III in FIG. 2 where some components are omitted for clarity of illustration.

Further to being located intermediate the body locating roller and the shelf edge relative to the transverse direction, the transition bar 54 can be arranged to be spaced below the outer circumferential surface 38 of the roller 33 in the raised condition of the body locating roller, so that the transition bar is presented at a suitable location where at a prescribed height of the body locating roller above the shelf edge 3A a rounded outer surface 59 of the bar engages the outer surface 1A of the round body to transfer the round body from the initial loading position into an intermediary transfer position as the body locating roller continues to be displaced upwardly. That is, in the intermediary transfer position as shown for example in FIGS. 11 and 12 the round body is received between and thus in contact with the shelf edge 3A and the rounded outer surface 59 of the transition bar, and is no longer in contact with the body locating roller. As the carrier 22 continues to move upwardly thus displacing the transition bar upwardly higher above the shelf edge, the round body is urged to the storage position from the transfer position between transition bar 54 and shelf edge, being displaced in the forward loading direction FL by the vertically upward movement of the transition bar so as to cross the shelf edge and be placed within the shelf storage space of the shelf. Thus the rounded outer surface 59 of the transition bar defines a secondary body support surface of the apparatus that is available to contact the outer surface of the round body in a manner assisting the body in rolling movement into the storage position on the shelf.

It will be appreciated that in the transfer position the lateral support plates maintain the body 1 in the upstanding condition as a terminus of the inner support surfaces 43 of the plates 41, 42 that is distal to the body locating member but proximal to the shelf edge is located further in the forward loading direction FL than an innermost side of the rounded outer surface 59 of the transition bar proximal the shelf edge 3A.

The interconnection link 56 spans between the rounded transition bar 54 and the support post 46, which forms the common support framework of the body lifting arrangement together with the support beam 35. More specifically the link is pivotally cantilevered in the forward loading direction from the support post. By this pivotal connection of the link 56 to the support post which is located above the body locating roller 33 and defines a pivot axis P oriented horizontal and parallel to the longitudinal direction of the shelf, the transition bar 54 can be retracted relative to the body locating roller so that when the body locating roller is disposed by operation of the body lifting arrangement 20 at its lowest position relative to the ground surface G the transition bar 54 is rested on a horizontal rest plate 60 mounted to the intermediate frame member 16B at a spaced location from the body locating roller with respect to the transverse direction so as to be located at a minimum height from the body support surface of the locating member less than a prescribed transition height of the transition bar from the body support surface. This minimum height can be zero such in the lowest position of the body locating roller the transition bar is located in a common horizontal plane therewith.

As the body locating roller 33 is raised in fixed relation to the body lifting carrier 22, which also causes the pivotal joint of the interconnection link to the support post 46 to lift in fixed relation to the body locating roller, a vertical spacing between the transition bar 54 and the body locating roller is formed where a top of the rounded outer bar surface 59 is spaced vertically below a bottom of the circumferential outer roller surface 38. This vertical spacing is formed by downward movement of a distal end of the interconnection link 56, where the transition support member 54 is connected thereto, relative to the pivotal connection of the link at pivot axis P. The vertical spacing increases as the body locating roller 33 continues to be displaced upwardly to a maximum vertical spacing at which the transition bar 54 is deployed to the prescribed transition height below the body support surface of the body locating roller, at which height the transition bar 54 contacts the outer surface 1A of the round body in the raised condition of the body locating roller to transfer the body to the intermediary transfer position so that the body can pass across the shelf edge 3A. Once the transition bar 54 is deployed to the prescribed transition height relative the body locating roller, the transition bar moves upwardly with the carrier 22 in fixed relation to the body locating roller. A stop supported on common support framework of the body lifting arrangement, which in the illustrated arrangement is defined by the top 35A of the cantilevered beam, limits the downward pivotal movement of the link relative to the post 46 about the pivot axis P and thus defines the prescribed transition height of the bar 54.

The transition bar 54 is rounded around an axis T of the bar which is oriented horizontal and parallel to the longitudinal direction of the shelf so as to be parallel to the shelf edge 3A. The rounded bar 54 is supported in fixed relation with respect to the interconnection link 56 and thus does not rotate relative thereto.

In use the round body which is the tire in the illustrated arrangement is loaded onto the apparatus, which means the tire is placed in the initial loading position in which it is received between the outer roller surface 38 of the body locating roller and the shelf edge 3A. The outer surface 59 of the transition bar does not contact the outer surface 1A of the round body in the lowered condition of the body locating roller 33.

After loading onto the apparatus the body lifting arrangement 20 is operated so as to raise the carrier 20 thereby lifting the body locating member in vertically upward movement in a linear path, during which initial movement the distal end of the interconnection link 56 is pivoted downwardly relative to the pivot axis P at the opposite end of the link 56. The transition bar remains rested on the rest plate 60 until the body locating roller 33 effectively substantially attains the prescribed transition height above the ground surface G, at which height the stop defined by the top 35A of the cantilevered beam engages the link 56 so that the transition bar 54 is now raised together with the body locating roller in fixed relation thereto, maintaining a vertical spacing therebetween at a value of the prescribed transition height. The prescribed transition height of the transition bar relative to the roller is selected based on a diameter of the round body. In the illustrated arrangement the prescribed transition height is less than a height of the shelf edge 3A above the ground surface G which is about 19 inches.

As the body locating roller 33 is displaced upwardly by the carrier 22 the round body 1 is lifted and also is gradually rolled about the shelf edge 3A as a direct distance D, between the body support surface defined on the roller 33 and the shelf edge 3A where the outer surface 1A of the body is in contact, decreases while the body locating roller is moved vertically upwardly. The minimum such distance between the shelf edge 3A and the body support surface is attained in the illustrated arrangement when the circumferential outer surface 38 at the innermost end of the roller is in contact with the outer surface 1A of the body so as to define the body support surface of the locating member. In other arrangements in which the body locating member does not have a rounded outer surface the minimum distance between the body support surface and the shelf edge may be attained when the body support surface is located in a common horizontal plane with the shelf edge 3A such that both are located at a common height above the ground surface G. Throughout the loading procedure to place the round body in the storage position on the shelf, that is, in both the initial loading position and the transfer position, the round body remains in contact with the shelf edge 3A (except when the body locating roller traverses the initial range of heights from its lowest position to a predetermined height above the ground surface due to the presence and location of the track bar TB).

It is when the minimum distance between shelf edge 3A and the body support surface is attained that the secondary body support surface of the transition support member is brought to touch with the outer surface 1A of the round body so that the body continues to be displaced in the forward loading direction FL and rolled in this direction about the shelf edge 3A. After this point the body is supported between the shelf edge 3A and the transition bar 54, and the latter continues to be displaced vertically upwardly so that the round body continues to be lifted but more so is displaced thereby in the forward loading direction so as to be rolled across the shelf edge in the transverse direction and ultimately be placed within the shelf storage space in a manner remaining in same. In the storage position the tire 1 is oriented in the upstanding condition with its rotational axis substantially parallel to the longitudinal direction of the shelf.

Further to loading the tire onto the shelf 2, the apparatus is also configured for unloading the round body from the shelf located thereon in the storage position and in the upstanding condition so that there is no manual input from a human user in the act of displacing the round body over the shelf edge 3A onto the shelf nor back over the shelf edge 3 to the apparatus so as to return the body to the ground surface G. Thus the apparatus 10 includes a body unloading mechanism formed by an unloading arm 62 mounted on the frame so that a body contact surface 64 defined on the arm 62 is located in the exterior space E beneath the bottom shelf opening 8, as will be described in more detail shortly.

The tire 1 seated on the shelf in the storage position of the body is located transversely centrally of the shelf by the bottom opening 8. The bottom opening 8, too, is located transversely centrally of the shelf with either side of the opening 8 defined by inner oppositely facing sides of the tubes 5, 6 being equally spaced from the nearest longitudinally extending ends of the shelf 2, and, as such, a transverse center TC of the opening 8 which is between the shelf edge 3A and the terminus 3B of the shelf opposite the access side is aligned with the rotational axis B of the body 1 in a common vertical plane.

Via the bottom opening 8 a portion of the outer surface 1A of the body which is received in the opening can be contacted from beneath the shelf 2. The unloading arm 62 is formed by a primary bar 65 elongated in a longitudinal direction of the arm which is crosswise to the longitudinal direction of the shelf 2. At one end of the primary bar 65 which is located beneath the access side tube 5 that defines the shelf edge 3A, and thus located beneath the shelf, is defined a pivot axis U of the unloading arm oriented horizontally and parallel to the longitudinal direction of the shelf. This end of primary bar at which the pivot axis U is defined is located at a position spaced vertically below the shelf and spaced above the ground surface G (but located vertically closer to the shelf edge), and with respect to the transverse direction of the shelf is located intermediate the shelf edge 3A over which the round body is rolled for loading and unloading and that side 8A of the bottom opening which is proximal the shelf edge with respect to the transverse direction of the shelf.

Thus the unloading arm is movable relative to the shelf 2 by pivotal movement about the axis U so that a distal end of primary bar 65 with respect to the pivot axis U, which is located beneath the bottom opening 8 of the shelf, can be displaced from an idle position of the unloading arm in which this distal end is located in the exterior space E beneath the shelf, which is outside the shelf storage space, to an operating position in which this same end is located within the shelf storage space S by passing the end through the bottom opening 8 of the shelf. It will be appreciated that in the idle position the primary bar 65 extending from the shaft 74 defining pivot axis U to the distal end is inclined in a transverse direction directed from the shelf edge 3A to the opposite terminus 3B, and downwardly towards the ground surface G. Thus in the idle position the primary bar is located outside a path of the shelf 2 which it traverses along the vertical track of the tire carousel, in which the shelf still travels slightly downwardly from the loading height shown in the figures but in a direction away from the apparatus 10 so as to be somewhat parallel to the inclination of the primary bar in the idle position of the unloading arm.

At the end of the primary bar 65 that is distal to the unloading arm's pivot axis U is provided the body contact surface of the unloading arm which is defined by an outer surface 67 of a crosswise oriented rounded bar 68 affixed to the primary bar 65 in perpendicularly transverse relation thereto. Thus an axis of the rounded bar 68 is transverse to the longitudinal direction of the unloading arm, and the outer surface 67 is fixed in relation to this transverse axis of the unloading arm of the illustrated arrangement. Opposite ends of the rounded body contact bar 68 are located on either side of the primary bar 65.

As such by the pivotal movement of the arm 62 from the idle position to the operating position the outer surface 67 of bar 68 that defines the body contact surface follows an arcuate path extending upwardly and in the rearward unloading direction (which is transverse to the longitudinal direction of the shelf) once the body contact surface is above a horizontal plane containing the unloading arm's pivot axis U. Since the pivot axis U is located below the shelf the body contact surface follows this arcuate path in its path passing through the bottom shelf opening 8 and while located within the shelf storage space S.

The rounded bar 68 is located along the primary bar 65 at a suitable distance from the pivot axis U so that in the arcuate path of the body contact surface in the vicinity of the bottom shelf opening 8, when the body contact surface transitions from the exterior space E to the shelf storage space S through the bottom opening, the outer body contact surface 67 is located intermediate the transverse center TC of the bottom opening 8, which is halfway between the tubes 5 and 6, and the opposite longitudinally extending terminus 3B of the shelf. Thus at this location the outer body contact surface 67 coincides with a portion of the outer surface 1A of the tire exposed through the bottom opening 8 that is distal to the shelf edge 3A, and since the path traversed by the body contact surface 67 when engaged with the outer surface 1A of the round body is perpendicular to the rotational axis B of the round body 1 (though not necessarily oriented to intersect this axis B), the round body is displaceable by the unloading arm in the rearward unloading direction RU over the shelf edge 3A. Furthermore, with the body contact surface 67 traversing an arcuate path in the upward and rearward unloading direction, the body contact surface in the operating position and thus in contact with the outer body surface 1A is enabled to lift and roll the body 1 over the shelf edge 3A particularly since a bottom of the outer surface 1A is located below the shelf edge 3A when received in the bottom opening 8.

To facilitate movement of the unloading arm to displace the round body in the rearward unloading direction RU, the unloading arm further includes a secondary bar 73 which is connected to a shaft 74 defining the pivot axis U of the unloading arm and also to the primary bar 65 at a location thereon which is intermediate the pivot axis U and the crosswise rounded bar 68. The secondary arm 73 is elongated in the longitudinal direction of the unloading arm and is oriented parallel to the primary arm 65. The shaft 74 of the unloading arm is operatively supported for pivotal movement of the unloading arm on a short post 78 standing vertically upwardly from the proximal frame member 16A so that the unloading arm is mounted on the frame 12 of the apparatus.

The secondary bar 73 extends beyond the shaft 74 with respect to the longitudinal direction of the unloading arm but away from the body contact surface 67 and is presented at a location to one side of the shelf and thus not thereunder. To the secondary bar 73 is attached at a spaced location from the shaft 74 defining unloading arm pivot axis U a flexible linkage in the form of a fixed length of chain 80 that traverses a path from a first linkage end 81A coupled to the unloading arm to a second linkage end 81B presented at an access position of the unloading mechanism linkage adjacent the body lifting arrangement 20, as will be better appreciated shortly. In this access position of the second linkage end 81B it is available to be grabbed and pulled, so that the chain moves along its predetermined guided path along the apparatus frame 12 to displace the first linkage end 81A, which is movable in fixed relation to the unloading arm, so as to displace the unloading arm from the idle position to the operating position.

Since the apparatus 10 of the illustrated arrangement is configured for both loading and unloading, both of these functionalities are synchronized so that when the unloading arm is operated to displace the round body in the rearward unloading direction RU, the body locating roller 33 and transition bar 54 are presented for receiving the round body crossing the shelf edge 3A in this direction so that the body lifting arrangement can then be operated to lower the body 1 back to the ground surface G.

As the first linkage end 81A is spaced from the body lifting arrangement 20 in the forward loading direction FL so as to be located in proximity to the shelf where the unloading arm 62 is provided, the second linkage end 81B is spaced from the shelf edge 3A in the transverse direction of the shelf so that a portion of the flexible linkage of the unloading mechanism is located closer to the body lifting arrangement where the linkage can more suitably cooperate with same.

The second linkage end 81B is adapted for coupling with another element so as to be grabbed and pulled upwardly, and thus is defined by a rigid coupler plate 82 coupled to the end of the length of chain that locates an elongated catching slot 83 with a closed top terminus 83A. The coupler plate 82 is inclined upwardly and in the horizontal direction from the intermediate f towards relative to the transverse direction so that its free top end 82A is closer to the vertical carrier track than its bottom which is coupled to the chain 80.

In the access position the coupler plate 82 is supported at a fixed location in upstanding condition thereof, so that the catching 83 slot is oriented vertically upright, by receipt in a vertically downwardly depending storage slot 84A formed in and opening at a top of vertically upstanding support member 84B which is mounted to the intermediate frame member 16B. Thus the upstanding support member 84B carrying storage slot 84A acts as a stand for presenting the coupler plate 82 at a height above the ground surface G with the top 82A of the coupler plate in spaced horizontal relation from the vertical carrier track formed by the upstanding frame member 16D1. Further, in the access position the top 82A of the coupler plate is located intermediate the upstanding member 84B and the vertical track with respect to the horizontal direction. As such, the second linkage end 81B in the access position thereof, in which the second end is stationary awaiting to be grabbed and pulled, is located along a path of vertically upward and downward movement of the carrier 22 of the body lifting arrangement.

Thus, further is provided a catch of the unloading mechanism which is supported on the carrier 22 so as to be movably carried on the body lifting arrangement, and thus in turn movable in fixed relation to the body locating roller 33 also movably carried by the carrier 22.

The catch is formed by a plate 85 oriented in a vertically upstanding condition, so that a plane defined by the plate is oriented vertically, and which also is oriented in perpendicularly transversely to the longitudinal direction of the shelf. The catch plate 85 is slidably mounted to the carrier 22 via at least one slot 87 elongated in a horizontally transverse direction of the shelf through which is passed a connector 88 held in fixed relation to the carrier 22, so that the catch plate is slidable parallel to the forward loading direction FL for movement relative to the carrier between an inactive position and an active position which will be described shortly.

At an end of the catch plate 85 which is proximal the shelf edge is formed a hook 90 extending from a main body of the plate in the forward loading direction and upwardly to a terminus of the hook, so as to be adapted for coupling with the second linkage end 81B in the upward movement of the carrier 22 as the catch approaches from a height below the second linkage end disposed in the access position. In the inactive position of the catch, the plate is retracted in the horizontal direction relative to the coupler plate 82 so that the hook 90 is spaced from the top 82A of the coupler plate with respect to a horizontal direction, and thus does not coincide in horizontal location with the second linkage end in the access position, allowing the catch to pass clear of same in the upward and downward movement of the carrier 22 so as not to pull and grab the coupler plate 82.

In contrast, in the active position the catch plate is projecting towards the coupler plate 82 in the horizontal direction so as to bridge the horizontal gap otherwise formed between the catch plate 85 disposed in the inactive position and the second linkage end 81B disposed in the access position. As such, in the active position of the catch the hook 90 coincides in horizontal location with the catching slot 83 so as to grab the coupler plate 82 as the catch passes by same in the upward movement of the carrier 22.

In this manner the unloading mechanism is selectively activatable by positioning of the catch for operation to displace the round body off the shelf so as to move the body out of the storage position when the carrier, and the body locating member and transition member carried thereby, are displaced to a height for receiving the round body displaced out of the shelf storage space.

In use of the illustrated arrangement the catch which is supported on the carrier in a common vertical position therealong is disposed in the active position at a prescribed height of the carrier above the ground surface G but below the height of the second linkage end 81B in the access position so that as the body lifting arrangement is operated to lift the carrier to the prescribed height at which, during loading, the round body is completely transferred from the apparatus to the shelf so as to no longer be in contact with the transition bar 54.

Thus once the catch has grabbed the second linkage end 81B in the upward path of its vertical movement and remains connected to same the body contact surface 67 of the unloading arm is gradually displaced from the idle position to the operating position whilst the carrier 22 continues to progress in the upward path of movement before reaching a maximum unloading height of the body locating roller and the transition bar at which point the carrier stops, and so too does the body contact surface 67 which reaches its furthest point relative to the rearward unloading direction in its arcuate path of movement in the operating position. The maximum unloading height is lower than a maximum loading height attained by the body locating roller during the loading procedure in which the transition bar traverses an additional vertical distance to urge the rotational axis B of the round body past the shelf edge 3A relative to the forward loading direction FL so that the body axis is located between opposite shelf terminuses 3A and 3B in order for the body to remain on the shelf without rolling back into contact with the transition bar. The maximum unloading height of the illustrated arrangement is set by a length of the chain connected in fixed relation to the unloading arm, so that at the furthest point of arcuate movement of the body contact surface 67 its position relative to the shelf edge 3A is sufficient to urge the rotational axis B of the body past the shelf edge relative to the rearward unloading direction RU so that the body axis is located between the shelf edge 3A and the transition bar 54 in order for the body to remain therebetween without rolling back into contact with the unloading arm 62. Thus at the unloading height the body 1 is supported by the transition bar 54 and the shelf edge 3A.

In the downward path of movement of the carrier 22 from the maximum loading height the catch remains connected to the second end of the chain now traversing a downward portion of its vertically linear path until the catch passes by the support stand formed by member 83 where the second linkage end 81B is replaced to its access position and the catch plate 85 continues downwardly without the chain. Below where the second end of the chain is disposed in the access position there is provided a guide surface defined by a pair of plates 93 and 94 mounted to the frame adjacent the upstanding support member 83 on a side thereof opposite the vertical track member 16D1. The first plate 93 is oriented so as to be inclined downwardly and in a horizontal direction from the storage slot 84 towards the vertical track 16D1 carrying the carrier 22 so that the guide surface is shaped to guide the catch by contact with an outer surface thereof generally at the hook 90 from the active position back to the inactive position at a height of the body locating roller above the ground surface G, now in the lowered condition relative to the shelf edge 3A, as the catch plate 85 passes by the guide surface in downward movement. The second plate 94 is oriented vertically and positioned below the inclined plate 93 with a top of the bottom vertical plate being contiguous with a bottom of the inclined plate 93, so that along a bottom portion of the path of the catch the catch plate 85 is biased to remain in the inactive position. Further, a portion of the guide surface defined by the vertically upright second plate 94 is located closer to the vertical carrier track formed by upstanding frame member 16D1 than a side surface of the coupler plate 82 which is proximal and opposite the vertical carrier track so that the guided movement provided by the set of plates 93, 94 ensures the catch 85 returned to the inactive position can pass clear of the second linkage end in the access position if not subsequently displaced therefrom.

It will be appreciated that control of the apparatus 10 and of the tire carousel of which the shelf 2 forms a part can be cooperatively coupled so that, for example, the shelf is prevented from moving along the track of the carousel if the body locating member of the apparatus is not in the lowered condition.

The scope of the claims should not be limited by the preferred embodiments set forth in the examples but should be given the broadest interpretation consistent with the specification as a whole.

The invention claimed is:

1. An apparatus for moving a round body, which is rounded around a rotational axis of the round body, in upstanding condition, in which the rotational axis of the round body is oriented substantially horizontally so that the round body is enabled to roll across a surface, between a ground surface and a stationary shelf having a shelf edge spaced above the ground surface and extending in a longitudinal direction of the shelf, the apparatus in combination with the shelf comprising:

a frame adapted for resting on the ground surface;

a body locating member defining a body support surface on an inner side of the body locating member spaced from the shelf edge in a transverse direction crosswise to the longitudinal direction for engaging an outer surface of the round body and locating the round body in contact with the shelf edge so that the round body is confined in fixed location between the body locating member and the shelf edge;

a pair of lateral support members each defining an upright inner surface in opposite spaced relation to the inner surface of the other one of the lateral support members for receiving the round body in the upstanding condition between the pair of lateral support members when the round body is confined in fixed location between the body support surface of the body locating member and the shelf edge;

the body locating member being movably carried on a body lifting arrangement supported on the frame, the body lifting arrangement being operable to displace the body locating member in upward and downward movement between a lowered condition of the body locating member in which the body support surface is located below the shelf edge so as to be suited for passing the round body over and across the body locating member into an initial loading position in which the round body in the upstanding condition is received between the body support surface and the shelf edge and between the lateral support members, and a raised condition of the body locating member in which the body support surface is located above the shelf edge, so as to cooperate with the shelf edge which is stationary to lift the round body from the ground surface and roll the round body over the shelf edge onto the shelf to dispose the round body in a storage position on the shelf;

wherein the body locating member comprises a roller mounted on the body lifting arrangement for rotational movement about a roller axis oriented substantially horizontal and substantially parallel to the longitudinal direction of the shelf, a circumferential outer surface of the roller defining the body support surface of the body locating member; and a fixed member carried by the body lifting arrangement defining a free longitudinal edge extending substantially parallel to the roller axis, the free edge of the fixed member being located above the circumferential outer surface of the roller and being spaced away from an innermost end of the roller that is proximal the shelf edge, so as to provide a fixed traction surface positioned to engage the outer surface of the round body when the round body is displaced in a rearward unloading direction out of the initial loading position to remove the round body from the apparatus.

2. The apparatus of claim 1, in combination with the shelf, further including a transition support member movably carried on the body lifting arrangement, the transition support member defining a secondary body support surface disposed at a location which is spaced from the body support surface of the body locating member in a forward loading direction towards the shelf edge so as to be located intermediate the body support surface and the shelf edge, and which is arranged to be spaced below the body support surface in the raised condition of the body locating member for engaging the outer surface of the round body at a prescribed height of the body locating member above the shelf edge to transfer the round body from the initial loading position into a transfer position as the body lifting arrangement continues to displace the body locating member upwardly, the round body disposed in the transfer position being received between the shelf edge and the second body support surface of the transition support member, so as to urge the round body to be displaced in the forward loading direction across the shelf edge and onto the shelf.

3. The apparatus of claim 2, in combination with the shelf, wherein the transition support member is cantilevered in the forward loading direction from a common support framework which is coupled to the body lifting arrangement and to which the body locating member is coupled.

4. The apparatus of claim 3, in combination with the shelf, wherein the transition support member is connected to an interconnection link spanning from the transition support member to the common support framework, the interconnection link being pivotally connected to the common support framework to define a pivot axis oriented substantially horizontal and substantially parallel to the longitudinal direction of the shelf so that in the lowered condition of the body locating member when the body locating member is located at the ground surface the transition support member is located at a minimum height from the body support surface of the body locating member and in the raised condition of the body locating member the transition support member is deployed to a prescribed height below the body support surface of the body locating member, by downward movement about the pivot axis of a distal end of the interconnection link where the transition support member is connected, so as to be suited for engaging the outer surface of the round body at the prescribed height of the body locating member above the shelf edge to transfer the round body from the initial loading position to the transfer position.

5. The apparatus of claim 1, in combination with the shelf, wherein the free edge is spaced outwardly away from the roller axis, so as to be spaced from the roller axis in the rearward unloading direction, such that the free edge of the fixed member is located above the circumferential outer surface but between the roller axis and an outermost end of the roller that is distal to the shelf edge.

6. The apparatus of claim 1, in combination with the shelf, wherein the fixed member defines an upper surface extending from the free edge that is inclined downwardly and outwardly away from the innermost end of the roller so as to avoid engaging the outer surface of the round body in the initial loading position.

7. The apparatus of claim 1, in combination with the shelf, further including a body unloading mechanism configured to engage a portion of the outer surface of the round body distal to the shelf edge when the round body is disposed on the shelf in the storage position so as to displace the round body in a rearward unloading direction, which is opposite to the forward loading direction, over the shelf edge to the apparatus.

8. The apparatus of claim 7, in combination with the shelf, wherein the body unloading mechanism is operable by upward movement of the body locating member from the lowered condition to the raised condition that is effected by the body lifting arrangement.

9. The apparatus of claim 8, in combination with the shelf, wherein the body unloading mechanism comprises:
   an unloading arm defining a body contact surface for engaging the outer surface in the storage position;
   the unloading arm being mounted on the frame so that the body contact surface is movable relative to the shelf in a direction arranged perpendicularly to the rotational axis of the round body between an idle position in which the body contact surface is located outside a shelf storage space defined vertically above the shelf in which the round body is located in the storage position and an operating position in which the body contact surface is disposed within the shelf storage space;
   a flexible linkage having a first end coupled to the unloading arm located at a position which is spaced from the body lifting arrangement in the forward loading direction and traversing a path from the first end at the unloading arm to a second end of the flexible linkage located at an access position adjacent the body lifting arrangement and spaced from the shelf edge in the transverse direction, the first end of the flexible linkage being movable in fixed relation to the unloading arm so that movement of the first end of the flexible linkage effects movement of the unloading arm from the idle position to the operating position;
   wherein there is provided a catch movably carried on the body lifting arrangement so as to be movable in fixed relation to the body locating member, the catch being adapted for coupling with the second end of the flexible linkage so as to grab and pull the flexible linkage to displace the unloading arm from the idle position to the operating position in the upward movement of the body locating member;
   the second end of the flexible linkage disposed in the access position being presented at a location which lies along a path of upward and downward movement of the catch so as to be suitably located for grabbing by the catch;
   the catch being movable relative to the body lifting arrangement between an inactive position in which the catch is spaced relative to a horizontal direction from the second end of the flexible linkage disposed in the access position so as to pass clear of the second end of the flexible linkage in the path of upward and downward movement of the catch to an active position in which the catch coincides in horizontal location with the second end of the flexible linkage so as to grab the second end of the flexible linkage as the catch passes by the second end in the upward movement of the body locating member such that the body unloading mechanism is selectively activatable for operation to displace the round body off the shelf so as to move the round body out of the storage position.

10. The apparatus according to claim 9, in combination with the shelf, further including a guide surface supported on the frame at a location below the access position of the second end of the flexible linkage in which the second end of the flexible linkage is located at a height above the catch in the lowered condition of the body locating member when the body locating member is located at the ground surface, the guide surface being inclined downwardly and in a horizontal direction from the second end of the flexible linkage towards the catch, so as to engage an outer surface of the catch in downward movement of the body locating member such that the catch is displaced by contact with the guide surface from the active position to the inactive position.

11. The apparatus of claim 7, in combination with the shelf, wherein, when the shelf defines a bottom opening which is spaced in a transverse direction crosswise to the longitudinal direction from the shelf edge so that an exterior space beneath the shelf is communicable with the shelf storage space above the shelf via the bottom opening, the apparatus further includes an unloading arm defining a body contact surface for engaging the outer surface of the round body in the storage position;
   the unloading arm being mounted on the frame so that the body contact surface is movable relative to the shelf in a direction arranged perpendicularly to the rotational axis of the round body between an idle position in which the body contact surface is located outside a shelf storage space defined vertically above the shelf in which the round body is located in the storage position and an operating position in which the body contact surface is disposed within the shelf storage space;

wherein the body contact surface of the unloading arm disposed in the idle position is located in the exterior space beneath the shelf so that in movement of the unloading arm from the idle position to the operating position the body contact surface is passed through the bottom opening of the shelf to engage the portion of the outer surface of the round body distal to the shelf edge.

12. The apparatus of claim 11, in combination with the shelf, wherein the unloading arm is pivotally mounted on the frame at a pivot axis located below the shelf so that in movement from the idle position to the operating position the body contact surface follows an arcuate path extending upwardly and transversely to the longitudinal direction in the unloading direction so as to lift and roll the round body over the shelf edge.

13. The apparatus of claim 12, in combination with the shelf, wherein, when the bottom opening is located centrally with respect to the transverse direction between the shelf edge and an opposite longitudinally extending terminus of the shelf so as to be suited for locating the round body transversely centrally in the shelf storage space, the bottom opening being spaced in the transverse direction from each of the shelf edge and the opposite longitudinally extending terminus of the shelf, the body contact surface is located intermediate a transverse center of the bottom opening and the opposite longitudinally extending terminus of the shelf when the body contact surface transitions from the exterior space to the shelf storage space through the bottom opening in the arcuate path of the body contact surface.

14. The apparatus of claim 12, in combination with the shelf, wherein the pivot axis of the unloading arm is located at a position spaced vertically below the shelf and intermediate the shelf edge over which the round body is rolled in the unloading direction and a side of the bottom opening which is proximal the shelf edge relative to the transverse direction.

15. The apparatus of claim 1, in combination with the shelf, wherein the body locating member is movable along a vertically linear path in the upward and downward movement between the lowered condition and the raised condition.

16. An apparatus for moving a round body, which is rounded around a rotational axis of the round body, in upstanding condition, in which the rotational axis of the round body is oriented substantially horizontally so that the round body is enabled to roll across a surface, between a ground surface and a stationary shelf having a shelf edge spaced above the ground surface and extending in a longitudinal direction of the shelf, the apparatus in combination with the shelf comprising:

a frame adapted for resting on the ground surface;
a body locating member defining a body support surface on an inner side of the body locating member spaced from the shelf edge in a transverse direction crosswise to the longitudinal direction for engaging an outer surface of the round body and locating the round body in contact with the shelf edge so that the round body is confined in fixed location between the body locating member and the shelf edge;

a pair of lateral support members each defining an upright inner surface in opposite spaced relation to the inner surface of the other one of the lateral support members for receiving the round body in the upstanding condition between the pair of lateral support members when the round body is confined in fixed location between the body support surface of the body locating member and the shelf edge;

the body locating member being movably carried on a body lifting arrangement supported on the frame, the body lifting arrangement being operable to displace the body locating member in upward and downward movement between a lowered condition of the body locating member in which the body support surface is located below the shelf edge so as to be suited for passing the round body over and across the body locating member into an initial loading position in which the round body in the upstanding condition is received between the body support surface and the shelf edge and between the lateral support members, and a raised condition of the body locating member in which the body support surface is located above the shelf edge, so as to cooperate with the shelf edge which is stationary to lift the round body from the ground surface and roll the round body over the shelf edge onto the shelf to dispose the round body in a storage position on the shelf; and a transition support member movably carried on the body lifting arrangement, the transition support member defining a secondary body support surface disposed at a location which is spaced from the body support surface of the body locating member in a forward loading direction towards the shelf edge so as to be located intermediate the body support surface and the shelf edge, and which is arranged to be spaced below the body support surface in the raised condition of the body locating member for engaging the outer surface of the round body at a prescribed height of the body locating member above the shelf edge to transfer the round body from the initial loading position into a transfer position as the body lifting arrangement continues to displace the body locating member upwardly, the round body disposed in the transfer position being received between the shelf edge and the second body support surface of the transition support member, so as to urge the round body to be displaced in the forward loading direction across the shelf edge and onto the shelf.

17. An apparatus for moving a round body, which is rounded around a rotational axis of the round body, in upstanding condition, in which the rotational axis of the round body is oriented substantially horizontally so that the round body is enabled to roll across a surface, between a ground surface and a stationary shelf having a shelf edge spaced above the ground surface and extending in a longitudinal direction of the shelf, the apparatus in combination with the shelf comprising:

a frame adapted for resting on the ground surface;
a body locating member defining a body support surface on an inner side of the body locating member spaced from the shelf edge in a transverse direction crosswise to the longitudinal direction for engaging an outer surface of the round body and locating the round body in contact with the shelf edge so that the round body is confined in fixed location between the body locating member and the shelf edge;

a pair of lateral support members each defining an upright inner surface in opposite spaced relation to the inner surface of the other one of the lateral support members for receiving the round body in the upstanding condition between the pair of lateral support members when the round body is confined in fixed location between the body support surface of the body locating member and the shelf edge;

the body locating member being movably carried on a body lifting arrangement supported on the frame, the body lifting arrangement being operable to displace the body locating member in upward and downward movement between a lowered condition of the body locating member in which the body support surface is located below the shelf edge so as to be suited for passing the round body over and across the body locating member into an initial loading position in which the round body in the upstanding condition is received between the body support surface and the shelf edge and between the lateral support members, and a raised condition of the body locating member in which the body support surface is located above the shelf edge, so as to cooperate with the shelf edge which is stationary to lift the round body from the ground surface and roll the round body over the shelf edge onto the shelf to dispose the round body in a storage position on the shelf; and a body unloading mechanism configured to engage a portion of the outer surface of the round body distal to the shelf edge when the round body is disposed on the shelf in the storage position so as to displace the round body in a rearward unloading direction, which is opposite to the forward loading direction, over the shelf edge to the apparatus, wherein the body unloading mechanism comprises:

an unloading arm defining a body contact surface for engaging the outer surface of the round body in the storage position;

the unloading arm being mounted on the frame so that the body contact surface is movable relative to the shelf in a direction arranged perpendicularly to the rotational axis of the round body between an idle position in which the body contact surface is located outside a shelf storage space defined vertically above the shelf in which the round body is located in the storage position and an operating position in which the body contact surface is disposed within the shelf storage space;

a flexible linkage having a first end coupled to the unloading arm located at a position which is spaced from the body lifting arrangement in the forward loading direction and traversing a path from the first end at the unloading arm to a second end of the flexible linkage located at an access position adjacent the body lifting arrangement and spaced from the shelf edge in the transverse direction, the first end of the flexible linkage being movable in fixed relation to the unloading arm so that movement of the first end of the flexible linkage effects movement of the unloading arm from the idle position to the operating position;

wherein there is provided a catch movably carried on the body lifting arrangement so as to be movable in fixed relation to the body locating member, the catch being adapted for coupling with the second end of the flexible linkage so as to grab and pull the flexible linkage to displace the unloading arm from the idle position to the operating position in upward movement of the body locating member from the lowered condition to the raised condition that is effected by the body lifting arrangement;

the second end of the flexible linkage disposed in the access position being presented at a location which lies along a path of upward and downward movement of the catch so as to be suitably located for grabbing by the catch;

the catch being movable relative to the body lifting arrangement between an inactive position in which the catch is spaced relative to a horizontal direction from the second end of the flexible linkage disposed in the access position so as to pass clear of the second end of the flexible linkage in the path of upward and downward movement of the catch to an active position in which the catch coincides in horizontal location with the second end of the flexible linkage so as to grab the second end of the flexible linkage as the catch passes by the second end in the upward movement of the body locating member such that the body unloading mechanism is selectively activatable for operation to displace the round body off the shelf so as to move the round body out of the storage position.

* * * * *